United States Patent [19]

Damian et al.

[11] Patent Number: 5,212,791
[45] Date of Patent: May 18, 1993

[54] DYNAMIC SCHEDULING

[75] Inventors: Richard G. Damian, Palo Alto; Manesh J. Shah, San Jose, both of Calif.

[73] Assignee: International Business Machines Corporation, Armonk, N.Y.

[21] Appl. No.: 920,000

[22] Filed: Jul. 27, 1992

Related U.S. Application Data

[63] Continuation of Ser. No. 413,412, Sep. 27, 1989, abandoned.

[51] Int. Cl.$^5$ .................. G06F 15/20; G06F 15/46
[52] U.S. Cl. ............................ 395/650; 395/904; 395/926; 395/912; 395/919; 364/DIG. 1; 364/DIG. 2
[58] Field of Search ... 364/200 MS File, 900 MS File, 364/468; 395/904, 926

[56] References Cited

U.S. PATENT DOCUMENTS

| | | | |
|---|---|---|---|
| 4,209,898 | 7/1980 | Acki et al. | 29/783 |
| 4,561,201 | 12/1985 | Sanborn | 40/213 |
| 4,617,638 | 11/1986 | Krause et al. | 364/557 |
| 4,711,543 | 12/1987 | Blair et al. | 352/87 |
| 4,746,995 | 5/1988 | Rauskolb | 360/31 |
| 4,994,980 | 2/1991 | Lee et al. | 364/475.15 |
| 5,040,123 | 8/1991 | Barber et al. | 364/468 |

OTHER PUBLICATIONS

Lee, J. K. and Suh, M. S. "PAMS-A Domain-Specific Knowledge-based parallel Machine Scheduling System". Expert Systems, vol. 5, No. 3, (Aug. 1988), pp. 198-214.
T. J. Williams, "Recent Developments In The Application Of Plant-Wide Computer Control" Computers In Industry vol. 8, No. 2 pp. 233-254 Mar. 1987.
M. J. Shaw and C. M. Morley, "A Knowledge Based Dynamic Scheduler In Distributed Computer Control" Proceedings of ISA/88 International Conference and Exhibit Oct. 1988.
M. Numao and S. Morishita, "Scheplan-A Scheduling Expert For Steel-Making Process" IEEE Transactions Jun. 1988.
"An Expert System For Scheduling In A Flexible Manufacturing System", B. Sauve, et al., Robotics and Computer Integrated Manufacturing, vol. 3, No. 2, 1987, Elmsford, NY, pp. 229-233.
"Evaluation of Traditional Work Scheduling Rules In A Flexible Manufacturing System With A Physical Simulator", R. Choi, et al., Journal of Manufacturing Systems, vol. 7, No. 1, 1988, pp. 33-45, Dearborn, Michigan.
"PAMS: A Domain Specific Knowledge Based Parallel Machine Scheduling System", J. K. Lee, et al., Expert Systems, vol. 5, No. 3, 1988, Oxford GB, pp. 198-214.

Primary Examiner—Thomas M. Heckler
Assistant Examiner—A. Katbab
Attorney, Agent, or Firm—L. Keith Stephens; G. Marlin Knight

[57] ABSTRACT

The invention provides a new production scheduling system. The system includes a technique that utilizes a knowledge base system to dynamically schedule production of parts on a plurality of manufacturing machines. The schedule is updated dynamically to conserve synergism with the changing plant environment. The schedule is created to conform with predefined rules to conserve constraints imposed by the machinery to create parts of different specifications. The rules may be hard in that they may be specifiable in mathematical terms or they may be heuristic and soft in that they may be allowed to be relaxed as determined by operators who have learned from experience with the production machinery. Finally, the invention allows interactive monitoring and adjustment of the schedule by an operator including selective seeding of the schedule.

5 Claims, 10 Drawing Sheets

```
**************************************************
**      STEEL PLANT SCHEDULER DEMO      **
**************************************************

RAW ORDER LISTING
```

| | PRODUCT | WIDTH | QUANTITY | PTS CARBON | SPECIAL |
|---|---|---|---|---|---|
| 1 | 201 | 90 | 2 | 10 | N |
| 2 | 201 | 90 | 2 | 10 | N |
| 3 | 101 | 89 | 2 | 5 | Y |
| 4 | 101 | 89 | 2 | 5 | Y |
| 5 | 301 | 87 | 1 | 50 | N |
| 6 | 301 | 83 | 2 | 50 | N |
| 7 | 301 | 83 | 2 | 50 | N |
| 8 | 301 | 74 | 1 | 50 | N |
| 9 | 401 | 86 | 1 | 50 | N |
| 10 | 401 | 75 | 1 | 50 | N |
| 11 | 501 | 87 | 1 | 50 | Y |
| 12 | 601 | 82 | 1 | 150 | N |
| 13 | 101 | 90 | 2 | 5 | Y |
| 14 | 101 | 90 | 2 | 5 | Y |
| 15 | 301 | 86 | 1 | 50 | N |
| 16 | 301 | 80 | 1 | 50 | N |
| 17 | 301 | 73 | 1 | 50 | N |
| 18 | 401 | 84 | 3 | 50 | N |
| 19 | 401 | 84 | 3 | 50 | N |
| 20 | 401 | 84 | 3 | 50 | N |
| 21 | 401 | 74 | 2 | 50 | N |
| 22 | 401 | 74 | 2 | 50 | N |
| 23 | 501 | 82 | 2 | 50 | Y |
| 24 | 501 | 82 | 2 | 50 | Y |
| 25 | 301 | 84 | 2 | 50 | N |
| 26 | 301 | 84 | 2 | 50 | N |
| 27 | 301 | 75 | 1 | 50 | N |
| 28 | 401 | 88 | 1 | 50 | N |
| 29 | 401 | 88 | 1 | 50 | N |
| 30 | 501 | 88 | 1 | 50 | Y |
| 31 | 501 | 76 | 2 | 50 | N |
| 32 | 501 | 76 | 2 | 50 | N |

92 ORDERS WERE READ FROM THE INPUT FILE

HIT ENTER TO CONTINUE

FIG. 2

```
            SCHEDULE:     1
*************************************************************
*1*      / 0 *9*     / 0 *17*    / 0 *25*    / 0 *33* XXX / 0 *
*2*      / 0 *10*    / 0 *18*    / 0 *26*    / 0 *34* XXX / 0 *
*3*      / 0 *11*    / 0 *19*    / 0 *27*    / 0 *35* XXX / 0 *
*4*      / 0 *12*    / 0 *20*    / 0 *28*    / 0 *36* XXX / 0 *
*************************************************************
*5*      / 0 *13* XXX/ 0 *21*    / 0 *29*    / 0 *37*     / 0 *
*6*      / 0 *14* XXX/ 0 *22*    / 0 *30*    / 0 *38*     / 0 *
*7*      / 0 *15* XXX/ 0 *23*    / 0 *31*    / 0 *39*     / 0 *
*8*      / 0 *16* XXX/ 0 *24*    / 0 *32*    / 0 *40* 301/86 *
*************************************************************
```

```
PLACE AN X AT THE DOWNTURN LOCATIONS
    DAY NIGHT
     -    -        MONDAY
     -    X        TUESDAY
     -    -        WEDNESDAY
     -    -        THURSDAY
     X    -        FRIDAY
WHAT IS THE MAXIMUM ACCEPTABLE WIDTH CHANGE ?          04
SHOULD THE ALTERNATE WIDTH RULE BE ACTIVATED ? (Y/N)   N
DO YOU WANT TO DIRECT THE OUTPUT TO A FILE ? (Y/N)     Y
DO YOU WISH TO PRINT VERBOSELY ? (Y/N)                 N
MAXIMUM ALLOWABLE NIGHT TURN SPECIALS                  0

UPDATE MENU AND THEN HIT ENTER
```

FIG. 8

| MONDAY | TUESDAY | WEDNESDAY | THURSDAY | FRIDAY |
|---|---|---|---|---|
| 1 | 9 | 17 | 25 | 33 XXXXXXXXXXX |
| 2 | 10 | 18 | 26 | 34 XXXXXXXXXXX |
| 3 | 11 | 19 | 27 | 35 XXXXXXXXXXX |
| 4 | 12 | 20 | 28 | 36 XXXXXXXXXXX |
| 5 | 13 XXXXXXXXXXX | 21 | 29 | 37 |
| 6 | 14 XXXXXXXXXXX | 22 | 30 | 38 |
| 7 | 15 XXXXXXXXXXX | 23 | 31 | 39 |
| 8 | 16 XXXXXXXXXXX | 24 | 32 | 40 301/86/050/N |

UNASSIGNED ORDERS

| | | | | |
|---|---|---|---|---|
| 201/90/010/N | 501/87/050/Y | 401/74/050/N | 501/76/050/N | |
| 201/90/010/N | 601/82/150/N | 501/82/050/Y | | |
| 101/89/005/Y | 101/90/005/Y | 501/82/050/Y | | |
| 101/89/005/Y | 101/90/005/Y | 301/84/050/N | | |
| 301/87/050/N | 301/80/050/N | 301/84/050/N | HERE IS THE INITIAL SCHEDULE... | |
| 301/83/050/N | 301/73/050/N | 301/75/050/N | HIT ENTER | |
| 301/83/050/N | 401/84/050/N | 401/88/050/N | | |
| 301/74/050/N | 401/84/050/N | 401/80/050/N | | |
| 401/86/050/N | 401/84/050/N | 501/88/050/Y | | |
| 401/75/050/N | 401/74/050/N | 501/76/050/N | | |

FIG. 9

| MONDAY | TUESDAY | WEDNESDAY | THURSDAY | FRIDAY |
|---|---|---|---|---|
| 1 101/89/005/Y | 9 | 17 101/90/005/Y | 25 | 33 XXXXXXXXXXX |
| 2 101/89/005/Y | 10 | 18 101/90/005/Y | 26 | 34 XXXXXXXXXXX |
| 3 501/88/050/Y | 11 | 19 | 27 | 35 XXXXXXXXXXX |
| 4 501/87/050/Y | 12 601/82/150/N | 20 | 28 | 36 XXXXXXXXXXX |
| 5 | 13 XXXXXXXXXXX | 21 | 29 | 37 201/90/010/N |
| 6 | 14 XXXXXXXXXXX | 22 | 30 | 38 201/90/010/N |
| 7 | 15 XXXXXXXXXXX | 23 | 31 | 39 |
| 8 | 16 XXXXXXXXXXX | 24 | 32 301/73/050/N | 40 301/86/050/N |

UNASSIGNED ORDERS
501/76/050/N

| | |
|---|---|
| 301/87/050/N | 401/74/050/N |
| 301/83/050/N | 401/74/050/N |
| 301/83/050/N | 501/82/050/Y |
| 301/74/050/N | 501/82/050/Y |
| 401/86/050/N | 301/84/050/N |
| 401/75/050/N | 301/84/050/N |
| 301/80/050/N | 301/75/050/N |
| 401/84/050/N | 401/88/050/N |
| 401/84/050/N | 401/80/050/N |
| 401/84/050/N | 501/76/050/N |

ERROR — A RUN OF SPECIALS MUST NOT EXCEED THREE HEATS
ENTER THE NUMBER OF THE ORDER TO BE REMOVED

FIG. 10

| MONDAY | TUESDAY | WEDNESDAY | THURSDAY | FRIDAY |
|---|---|---|---|---|
| 1 101/89/005/Y | 9  401/74/050/N | 17 101/90/005/Y | 25 | 33 XXXXXXXXXXXX |
| 2 101/89/005/Y | 10 | 18 101/90/005/Y | 26 | 34 XXXXXXXXXXXX |
| 3 501/88/050/Y | 11 | 19 | 27 | 35 XXXXXXXXXXXX |
| 4 401/88/050/N | 12 601/82/150/N | 20 | 28 | 36 XXXXXXXXXXXX |
| 5 301/84/050/N | 13 XXXXXXXXXXXX | 21 | 29 | 37 201/90/010/N |
| 6 401/80/050/N | 14 XXXXXXXXXXXX | 22 | 30 | 38 201/90/010/N |
| 7 501/76/050/N | 15 XXXXXXXXXXXX | 23 | 31 | 39 |
| 8 501/76/050/N | 16 XXXXXXXXXXXX | 24 | 32 301/73/050/N | 40 301/86/050/N |

UNASSIGNED ORDERS

301/87/050/N   401/84/050/N
301/83/050/N   401/74/050/N
301/83/050/N   501/82/050/Y
301/74/050/N   501/82/050/Y
401/86/050/N   301/84/050/N
401/75/050/N   301/75/050/N
501/87/050/Y
301/80/050/N
401/84/050/N
401/84/050/N

ERROR – A 401 ORDER IS THE FIRST HEAT OF A TURN
ENTER THE NUMBER OF THE ORDER TO BE REMOVED

FIG. 11

| MONDAY | TUESDAY | WEDNESDAY | THURSDAY | FRIDAY |
|---|---|---|---|---|
| 1 101/89/005/Y | 9 301/83/050/N | 17 101/90/005/Y | 25 501/76/050/N | 33 XXXXXXXXXXXX |
| 2 101/89/005/Y | 10 501/82/050/Y | 18 101/90/005/Y | 26 501/76/050/N | 34 XXXXXXXXXXXX |
| 3 501/88/050/Y | 11 501/82/050/Y | 19 501/87/050/Y | 27 301/75/050/N | 35 XXXXXXXXXXXX |
| 4 401/88/050/N | 12 601/82/150/N | 20 401/86/050/N | 28 401/75/050/N | 36 XXXXXXXXXXXX |
| 5 301/84/050/N | 13 XXXXXXXXXXXX | 21 301/84/050/N | 29 301/74/050/N | 37 201/90/010/N |
| 6 401/84/050/N | 14 XXXXXXXXXXXX | 22 401/84/050/N | 30 401/74/050/N | 38 201/90/010/N |
| 7 401/84/050/N | 15 XXXXXXXXXXXX | 23 401/80/050/N | 31 401/74/050/N | 39 301/87/050/N |
| 8 301/83/050/N | 16 XXXXXXXXXXXX | 24 301/80/050/N | 32 301/73/050/N | 40 301/86/050/N |

UNASSIGNED ORDERS

FIG. 12

DYNAMIC SCHEDULING

This application is a continuation of application Ser. No. 07/413,412, filed Sep. 27, 1989, now abandoned entitled "DYNAMIC SCHEDULING", in the name of R. G. Damian and M. J. Shah.

FIELD OF THE INVENTION

This invention generally relates to production scheduling and more particularly to a technique for employing a knowledge base system to dynamically schedule production of parts on a plurality of manufacturing machines.

DESCRIPTION OF THE INVENTION

This invention solves the problem of dynamically scheduling production of parts on one or more manufacturing machines. The parts manufactured are assumed to have different characteristics and/or specifications such that either the machines have to be constantly adjusted or that the machines pose constraints on the manner in which the parts may be scheduled.

The production schedule is prepared on an IBM System/370 computer using a knowledge based tool, such as IBM's KnowledgeTool product described in *Knowledge Tool Application Development Guide*, SH20-9262, December 1988. The invention employs a cooperative technique so that while the program is running it allows the operator to intervene and add human decision overrides to the program decisions. The technique is illustrated with a scheduling problem encountered in steel production and the program implementation is illustrated on scheduling production on a continuous caster in the steel mill.

Applications of expert systems have been most popular in diagnostics and problem determination applications where extensive human/machine dialogue is common. In the application of control and scheduling in manufacturing plants high speed computations and iterative calculations are required in short time and the environment is changing continuously, while the human/computer dialog is going on. In such a manufacturing environment the traditional expert system programming techniques run into performance problems.

Examples of the use of expert systems in these environments are discussed in Manesh Shah and Christopher Morley, Proceedings of ISA/88 International Conference and Exhibit, October 1988, Houston, Texas; and Masayuki Numao and Shin-ichi Morishita, pp. 467-72, Proceedings of the International Workshop on Artificial Intelligence for Industrial Applications: IEEE AI (Cat. No. 88CH2529-6), Japan, May 1988, T.J. Williams, "Recent developments in the application of plant wide computer control", Computers In Industry, Vol 8 No 2, pp 233-254, March 1987.

In most manufacturing plants, when a multitude of different orders need to be fulfilled to satisfy a variety of customer applications, a need arises to manufacture the products with minimum time delay and maintaining at the same time, full utilization of the production resources.

While traditional linear programming techniques have been utilized to solve this scheduling problem with static conditions of the resources, this technique fails when production equipment is dynamically changing and poses operational constraints due to the nature of the equipment. Furthermore, the constraints as well as the requirements of the orders and their quality may be constantly shifting so that a static schedule optimization may become meaningless.

An additional complication arises from the fact that as the number of orders to fill available production "slots" increases, traditional techniques quickly become compute intensive since this problem requires nth power of m computations where n is the number of slots and m the number of orders to be filled. Since both n and m are constantly varying, and the production equipment may itself be subject to imperfect operation in meeting the goal of a particular order and its specifications, multiple iterations of linear programming type schedule calculations may be necessary. Furthermore, the constraints on the scheduling algorithm are in many cases imprecise in that they may be difficult (if not impossible) to put down in mathematical or algorithmic language. Many of the equipment constraints may be evolving from the operational experience of the production equipment.

SUMMARY OF THE INVENTION

The invention is a method for operating a computer system to generate schedules for a plurality of orders. The schedules have a plurality of slots for orders such as for various units of steel which are constrained in the order in which they can be processed. The method uses these constraints to generate an acceptable schedule. The method uses an inference engine in the computer system for processing a set of rules containing disposition, strategy and error detection rules. The system has working memory for storing a pool of schedules. The method uses a parent-child schedule concept in populating the pool and deleting unacceptable schedules from the pool. The pool is seeded with one or more schedules having a first slot filled by an order by processing predetermined strategy rules. If there is only one schedule it becomes the current parent schedule, otherwise one of the schedules must be selected as the current parent schedule. The scheduler engine, which is also implemented by one or more rules, is used to generate all possible child schedules for the current parent schedule with each child schedule having at least one more slot filled than the current parent schedule. The error detection rules calculate error counts for the child schedules which violate the error detection rules. After the children are placed in the pool the current parent schedule is deleted from the pool, since it no longer serves any purpose. The child schedules having error counts exceeding a predetermined error count threshold are deleted from the pool using the disposition rules. This allows unpromising schedules to be deleted early in the process. One of the schedules remaining in the pool is selected as the current schedule and the process is repeated over again with the children being generated and so forth until a completely filled schedule is found which meets the disposition rules. The schedule is not guaranteed to be optimal, but merely to meet the rules. If after the deleting step there are no schedules in the pool, then the process ends without producing a schedule. In an embodiment of the invention, the process may be stopped by an intervention of an operator who may cause the current parent schedule to be modified and all of the other schedules in the pool to be deleted. The processing loop is then resumed using only the parent schedule entered by the operator. The embodiment may also provide for monitoring a value representing the elapsed time or iterations through the loop of steps, and responsive to the value exceeding a limit, alter the disposition rules by lowering the threshold of error counts to a second preselected value and return previously deleted schedules having error counts less than the second preselected value back into the pool, thereby dynamically relaxing the rules so that an acceptable schedule may be found when it might otherwise take too long or not be able to find an acceptable schedule at all. The detailed embodiment discusses use of the invention to schedule orders for units of steel.

BRIEF DESCRIPTION OF THE DRAWINGS

The foregoing and other objects, aspects and advantages of the invention is better understood from the following detailed description of the preferred embodiment of the invention with reference to the accompanying drawings, in which:

FIG. 2 is an example of a weekly order subset for a continuous caster in accordance with the subject invention;

FIG. 8 illustrates a user's display for entering scheduler parameters to start the scheduling system in accordance with the present invention;

FIG. 9 illustrates the first phase of a user's display for progressively filling the weekly schedule table in accordance with the present invention;

FIG. 10 illustrates the second phase of a user's display for entering scheduler parameters to start the scheduling system in accordance with the present invention;

FIG. 11 illustrates a user's display for order rearrangement in accordance with the present invention;

FIG. 12 illustrates a user's display for final scheduling in accordance with the subject invention; and

DETAILED DESCRIPTION OF THE INVENTION

Figure 1:
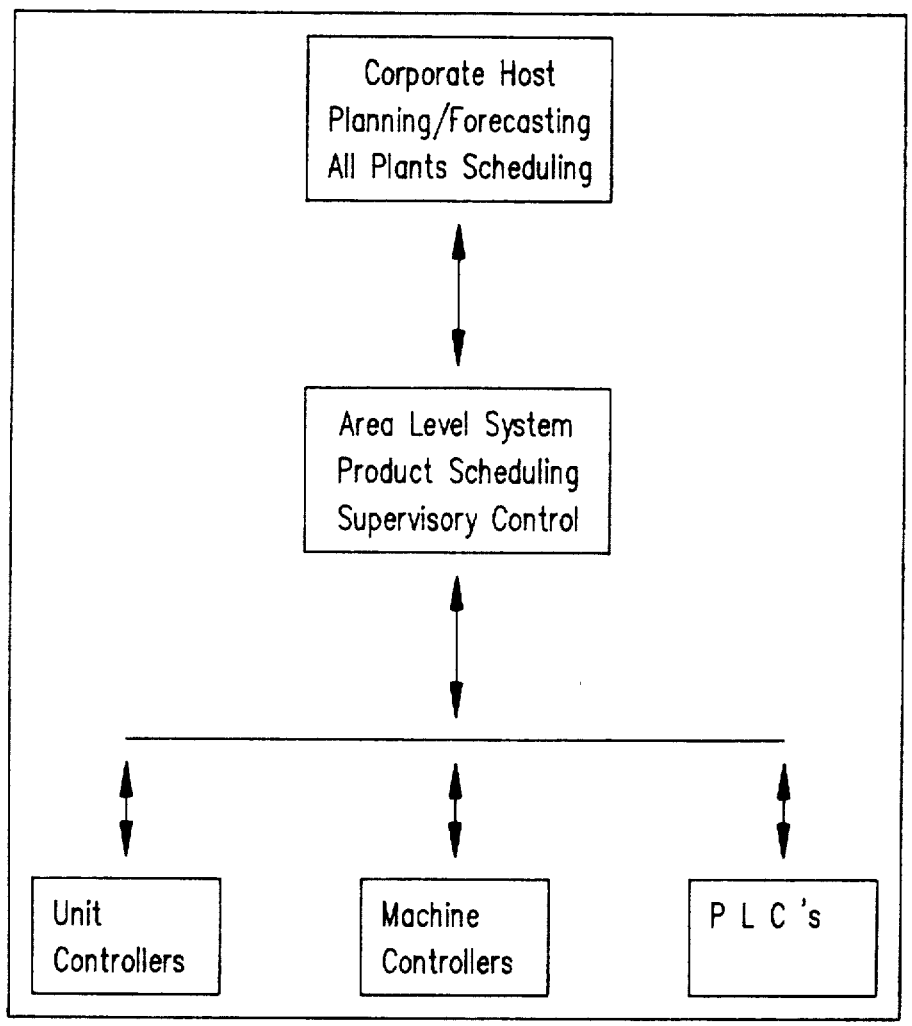
FIG. 1 block diagram of a typical Computer Integrated Manufacturing (CIM) distributed environment in accordance with the present invention.

FIG. 1 shows a typical flow of orders for production in a plant in a hierarchically distributed control system encountered in a Computer Integrated Manufacturing environment. At the lower level where the final production step occurs, the dynamics arise from the fact that the quality and specifications for the product may not be obtained from the scheduled run and the demands of the changing product specifications require constant modification of the equipment in real time.

The information regarding a set of orders with changing specifications is received from the upper level in Computer Integrated Manufacturing (CIM) hierarchy, whereas the equipment operational characteristics are constantly received from a lower level in the hierarchy which monitors and controls the production equipment.

THE MANUFACTURING PROCESS

The inventive technique is illustrated with an example in steel production. Steel is made from pig iron in basic oxygen furnace, followed by casting into slabs, blooms or billets. The rolling step transfers slabs into plates, coils or sheets and billets into seamless pipes, using mills for each product.

The scheduling problem arises in various steps of the steel making process. This includes the basic oxygen furnace, ladle refining (in some plants), and continuous casting. In addition, other steps of annealing, cold rolling, cutting etc. also require proper scheduling coordination to maintain optimum production, while servicing a variety of orders from customers.

Today's competitive market environment requires timely manufacture of a variety of high quality products for customers. In large steel mills as many as fifty different products may have to be made in a day. With the constraints imposed by the equipment in the mills, the task of scheduling production becomes too complex for plant personnel. It is not uncommon to find a team of "expert" schedulers in a steel plant, examining the week's order requirements, previous week's unfilled orders as well as critical orders to be filled and solving the crossword puzzle of juggling the schedules of available production equipment to fit the order needs. Depending upon the complexity of production equipment and operational constraints, it may require several hours of work to arrive at a reasonable schedule.

The implementation of the schedule beats the discretion of the plant operators, since the equipment is dynamically changing and may or may not meet constraints required for the product. When the product specifications are not met, the product must be sent to a pool of inventory of available products with certain specification range. This pool then is used as an inventory for possible future orders whose specifications may match those available in the pool. In the mean time the expert scheduler must repeat the solution of his scheduling puzzle to meet the production requirements. In addition, the scenario may have to be repeated for each subsequent process since the planned schedules for those steps may also be affected.

The scheduling problem discussed above is not unique to steel production. It is typical in all manufacturing processes consisting of sequential steps to create a variety of products which require constant changes in the production equipment at each step as a result of changing product specifications.

PROCESS CONSIDERATIONS

As stated earlier, the scheduling problem is defined as determination of what resources to allocate or assign to each product and its accompanying process at what time. These allocations must satisfy the equipment constraints which are generally stated in the form of "rules". The rules are derived from operation experience with the equipment and are often changing as more operational experience is gathered. Thus, the scheduling problem becomes a constraint satisfaction problem.

While it may be desirable to solve the interesting problem of finding an optimum schedule, for example with linear programming technique, not enough information is available for an objective function required in most optimization algorithms. Also problems of this type lead to combinatorial explosions resulting in long compute times often using input data from production which may lack in accuracy. The goal then generally is to find a feasible schedule or schedules which meet the constraints with a flexibility for the expert scheduler to select one among multiple schedules when available.

The steel making process is always sequential. The basic oxygen furnace prepares a charge, which is processed through a fixed sequence of refining, casting, annealing and so forth. To maximize equipment utilization, the steps following the furnace are continuous. The scheduler must fully utilize the continuous processes without overlapping. Furthermore, provisions must be made for continuous maintenance changes in the equipment such as re-lining of furnaces, tundish changes and resting/setup times required for change over from one product type to another. This does not include unscheduled outages due to equipment breakdowns and off specification products.

THE OVERALL PROBLEM

The scheduling algorithm/technique must meet the following requirements.

- Rule based scheduling to be performed at each of the multiple points in the production line, such as continuous casters, finishing area and cold rolling. Each point has different set of rules, clearly because the production equipment is different.
- The rule set must provide flexibility in that it should be modifiable.
- The human scheduler must have a capability of violating certain rules in order to attain a feasible schedule or processing an expedited or special order at the risk of violating one or more constraints.
- When multiple feasible schedules are obtained, the scheduling operator must have a capability of determining cost benefits of one schedule over another. Also a capability must exist for "what if" scenarios for the operator to be able to override/modify the schedules and find the penalty in terms of rule violations and cost.
- In brief, an extensive man/machine interaction capability with a computer scheduler is required such that the operator may be able to start with a partially filled schedule and obtain feasible schedules or in the case when no feasible schedule is available, to ease the constraints until an acceptable schedule is obtained.

RULES

Since the system is rule based, the complexity of the problem is based on the number of rules at each point of production. The continuous caster presents the largest number of rules or constraints. It may vary from twenty-five to one-hundred depending upon the definition of rules. Other units may have ten to fifteen rules and generally the constraints are not as severe as for the casters.

It is important to remember that a single rule may comprise of multiple constraints (in mathematical terms) but in a rule based expert system, multiple rules may be formulated with a single rule statement, as we show later. By the same token, many of the rules are guidelines or soft, which make mathematical or algorithmic statements difficult.

A typical soft rule may be stated as follows: avoid making low carbon steel as the first product after start up of the caster or a rule such as special alloy production should occur in batches of three in afternoon shift if possible. These rules come from the intuitive experience gained from the equipment by the operators.

SOLUTION

To illustrate our approach let us concentrate on the problem of allocating a single equipment resource to create multiple product variety continuously within the equipment constraints as dictated by the rules set up and learned from experience. The procedure is to be dynamic in that the schedules may need to be continuously revised as the production goals are in the process of being fulfilled. Furthermore, the schedule generation is cooperative, in the sense that the programming algorithm allows operator intervention at various points during sequential schedule generation to override the computer decisions, replace one or more orders and thus reseed the schedule at different points so as to include human intuition and judgement during the decision making process of the computer program.

In FIG. 1, the lowest level in the hierarchy controls equipment which runs the plant equipment and therefore maintains the up-to-date status of each production resource The area level system, in our hierarchy obtains the status information of all production equipment, maintenance schedules and so forth. At this level a determination is made to keep a running schedule of orders or products to be made at each of the production points in order to meet the weekly orders to be shipped from the plant based on the information received from the corporate system.

The goal of the rule based dynamic scheduler then is to arrange the schedule of production of different orders, each with distinct specification in such a way as to satisfy the constraints (be they hard or soft) imposed by the production equipment. The constraints are converted to rule based logic and expressed in an operator language where possible to allow modifiability as well as turning rules on and off. As stated before, a highly interactive environment is required by the expert scheduler to work with the area level system to perform the dynamic scheduling function as he/she chooses.

EXAMPLE

For illustration purposes select a weekly order set for the continuous caster to manufacture 30 to 40 products. Each product has specifications for carbon content, alloy type, special run and width. For the sake of simplicity let us say that there are two turns (twelve hours each) per day, designated as day and night turn and four products (heats) can be made per turn. Six different product types have to be made and they are numbered from one to six. Each product type is distinguished by carbon level, width and special alloy type. Scheduled downtime when the caster is shutdown for product change may be one or two turns in addition to Saturday and Sunday. With the assumptions above, the week's schedule is to be prepared for the orders on the continuous caster which is operated with constraints such as:

1. Carbon levels must not decrease on successive heats.
2. Width of slabs must not be increasing on successive heats.
3. Width decrease for the slabs on successive heats must be in small increments to be specified by the operator.
4. A maximum of two alloy products can be made in a single shift.

5. A maximum of three alloy products can be made in a single day.
6. Only one special alloy can be made per day
7. Specials should me made in the day turn as much as possible.

Figures 3, 4:
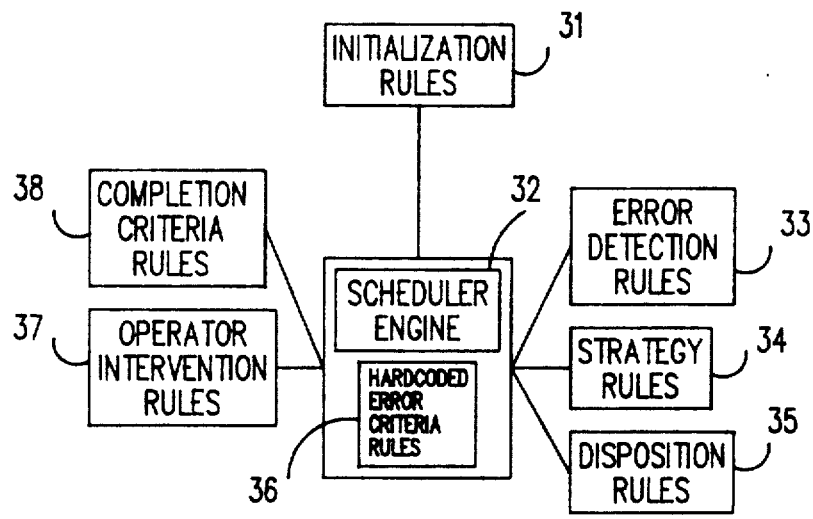
FIG. 3 is a typical weekly schedule table for a continuous caster in accordance with the subject invention.
FIG. 4 is a block diagram of the scheduling system in accordance with the subject invention.

FIG. 2 illustrates a weekly order for a continuous caster. In prior systems, human schedulers received the input list of orders from the ordering department office and manually determined a feasible sequence of production of the orders in a table. A simplified form of the table is shown in FIG. 3.

The human scheduler, proceeds by first blanking out portions of the table where the production equipment, in this case the caster, is known to be out of service for maintenance or other reasons. The scheduler then attempts to group orders and place them in the slots to meet the basic hard constraints such as the carbon and width rules in the above list. In the second round of analysis the scheduler attempts to meet the secondary or soft constraints to satisfy the production requirements. In the final round of analysis, the scheduler attempts to meet all the soft constraints such as those with "should" or "try" to complete the production schedule. When feasible sequencing is not possible, the constraints are eased somewhat to see whether orders can be scheduled with some penalty for violating the constraints.

The orders from the following week may be consulted to employ their results and exchange the current week's orders to arrive at a satisfactory schedule while altering the priorities of the delayed orders. An example of a typical weekly schedule table is provided in FIG. 3.

It should be clear from this description that a great deal of human intuition and judgement is utilized to arrive at a satisfactory schedule. Furthermore additional complications may arise as time progresses and experience is gathered from the operation of the equipment as follows.

As an example a modification of width constraint in the above list may be that at least two sequential heats must be of the same width. Another example may be that new products with different carbon levels or alloys and special characteristics may have to be manufactured in the future so that new rules have to be evolved and developed based on production experience with the caster.

The scheduling operation is thus continuously evolving and the "expert" must continuously modify rules/constraints in order to arrive at the basic sequences even without the problem of dynamic rescheduling required as a result of equipment malfunctions and off-spec products.

Many of the rules are based on quantities or variables which could be parameterized. For example the decreasing width between successive runs may be made as a parameter which can be modified prior to the start of a new schedule, thus facilitating a vehicle for relaxing of a constraint.

THE EXPERT SYSTEM APPROACH

Our approach includes the human scheduler in the decision process as much as possible in the following manner:

Provide ability to observe the schedules as being filled in by the program especially as the constraints are being met.

Allow manual intervention at any point so as to override the order sequencing and manipulate/exchange orders from next week's orders Allow on line easing of constraints when feasible schedules become difficult or impossible to obtain. Provide cost of violating the rules or easing of the rules to meet the order requirements.

Allow the ability to activate or deactivate the rules as deemed necessary by the user.

Allow the user to "seed" the schedules for the software to start from, provides that the seeds in the schedule follow all the rules.

We have formulated and solved this scheduling problem using the IBM program product Knowledge Tool. This tool provided high execution speed of a compiled language, efficiency of RETE algorithms, PL/I statements to provide procedural language for the sequencing logic and graphic interface required for user interaction as well as the rule formulation in PL/I like structure.

THE SOLUTION

An examination of the table in FIG. 3 suggests that if there are no restrictions, the number of possible schedules to fit the orders in open slots are very large indeed, the typical N-tuple numerical explosion. In actual practice because of a much larger number of orders and slots, the combinatorial explosion would be even greater than posed by our simplified subset under examination. The method of solution of this dilemma is to proceed as follows:

Start with a one or more seeds in the slot(s) which are the beginning after transition. For example, in FIG. 3 lowest carbon highest width heats on Monday morning and in the example of FIG. 3, Friday morning, can be scheduled. As an alternative the expert scheduler may provide other seeds.

With the seeded schedule determine children schedules for the next slot and match them against the constraints using the rule based algorithm. Discard the cases which violate the rules. Now the remaining partially filled table become the new parents from which the next slot may be filled using the remaining orders (heats). Again, the new set of children schedules are matched against the rules and only the valid ones are saved.

This process is continued until all the slots are filled.

In this scheme the final completed schedule may have multiple feasible solutions or may have none, depending upon the order/constraint combination. The scheme however allows quantifying soft constraints (such as "try avoiding" and "should if possible") and operator/user relaxing them as the solution progresses. Also, note that as the rules/constraints are increased, the solution speed increases because the number of discarded children schedule increases thus reducing the number of grandchildren schedules. The scheme also allows user intervention with partially filled schedule and manipulating manually part of the schedule when feasible schedules are not possible.

DISCUSSION OF THE ALGORITHM

Figure 5:
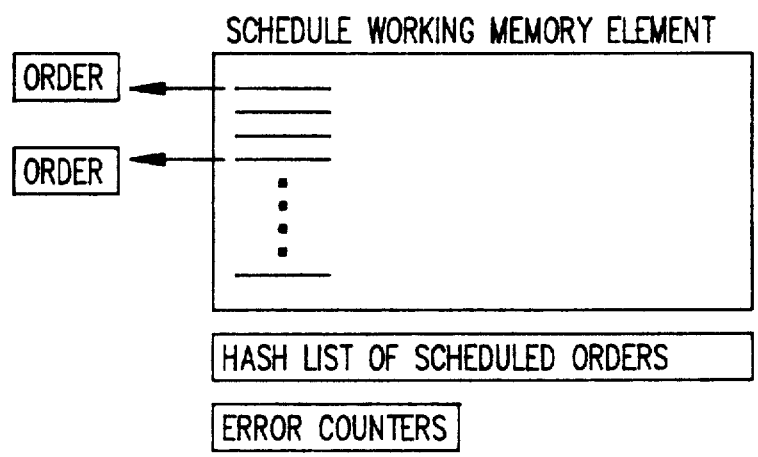
FIG. 5 is a functional layout of the computer memory in accordance with the present invention.

The data representation and analysis scheme is discussed in some detail next. Functional layout of the program is shown in FIG. 4 and FIG. 5. As orders are read in ("arrive to be filled") they are instantiated in Knowledge Tool working memory. Orders have attributes of order number, ASTM alloy classification, width, special flag and others. As working memory elements, they are accessible by the inference engine and therefore may be referenced by the premises of the rules.

Schedules are represented as members of a Knowledge Tool working memory class. This is a PL/I-like data structure. The body of the schedules is an array of pointer-like operators, called selectors in Knowledge Tool. A particular schedule slot is assigned to an order by pointing the slots' selector to the order. The selector scheme avoids duplicating order information and reduces the amount of region occupied by the schedule. Note that not all slots in a schedule may be filled. The user is prompted to block out an arbitrary number of slot regions as "downturns". These represent times during the work which is devoted to maintenance and no steel orders are processed.

The schedule also contains a hash list of assigned order identifications. This permits rapid checking of a schedule for the list of assigned orders. Also present are a series of error counters associated with a particular error condition. For example, there is an error counter which maintains a count of the number of width errors present in the schedule. This feature allows use to separate tracking of errors from the actions or disposition of the schedule.

INITIALIZATION

Reference will be made to FIG. 4 for the major components of the system. After the orders have been read into working memory, a single parent schedule is also instantiated. There are a small number of initialization rules 31 which specify conditions that allow immediate placement of orders. A typical proscription is that orders for low carbon steel must be filled first at the beginning of an active work cycle. The rule-based seeding of the schedule results in less than 10% of the orders filled on the parent schedule, but it is important for program efficiency and does not impact its generality. Given the combinatorial explosion of possible schedules, it is highly desirable, and the authors feel justified, to seed the original schedule with orders.

SCHEDULER ENGINE

There is a single rule whose responsibility is to generate new instances of the schedule class in working memory. A single schedule is chosen by the rule. This schedule becomes the "parent". The list of orders is scanned and is compared with the parent schedules' hash list of orders which are already present in slots on this schedule. This results in a list of orders not yet on the schedule. The strategy rules have determined the single empty slot (target slot) on this parent that are filled. Using the parent schedule as a template, "child" schedules are generated that look just like the parent, with one exception.

The target slot on each child contains a different member of the list of unfilled orders. Since the information that the parent contains has been passed to its children, the parent schedule is deleted from working memory and its space is freed.

After the schedules have been generated, they are examined by the error detection rules. Since our scenario included several conditions that could never be violated, these conditions are placed in hard coded error criteria rules 36 with the conclusion of the scheduling engine rule. One of the rules requires that carbon level must never decrease through adjacent slots. These rules represent the invariant portion of scheduling knowledge. They could also be implemented as a cluster of rules called from the right side of the scheduler engine. These rules prevent the generation of schedules that would otherwise be recognized as in error and would be immediately deleted by the disposition rules.

The scheduler engine 32 is a low priority rule. The next time it is active, it picks one of the "child" schedules just generated and uses it as a "parent" to generate further children. This new "parent" schedule is then deleted. In analogy to natural life, a parent is always deleted after consideration by the scheduler engine, whether it can produce children or not.

ERROR DETECTION RULES

The purpose of the error detection rules 33, which are medium priority rules, is to check newly generated schedules for error conditions. Since new rules may be added rather easily, this represents the area where transitory knowledge may be maintained. As a schedule is found to violate a particular condition, the rule counter for that schedule is updated.

STRATEGY RULES

The strategy rules 34 decide the next slot to be filled. In general, they try to fill slots in ways that constrain the schedule for the next schedule generate cycle. It is much faster to kill a child early with an abundance of rules, than it is to pattern match that same rule set against the multitude of children that it may produce. Strategy rules also select "promote" schedules via a priority counter to the scheduler engine if they are almost complete.

DISPOSITION RULES

The disposition rule 35 have been broken out from the error detection rules so that both the user and the program has some control over "desirable" conditions. That is, the user, and later the program should be able to relax certain conditions or reject a schedule for a variety of not necessarily connected conditions. These high priority disposition rules are monitoring the error counters associated with each schedule. Thanks to the RETE algorithm, disposition rules pattern match only on schedules whose counters have changed since the last match-select-act cycle.

OPERATOR INTERVENTION RULES

The operator intervention rules 37 allow operator intervention when a schedule of a particular type has (or hasn't) been found. It allows the operator to reseed a schedule at any point in program generation and to specify it as the prototypical parent schedule from which to generate other schedules. This provision allows the operator to override the program and also to force processing of a new block of orders that may just have been presented.

COMPLETION CRITERIA RULES

The completion criteria rules 38 recognize the first acceptable schedule and present it to the user. They could also be used to selectively reseed a new schedule if no acceptable schedule is found or to consider additional orders. Note that this program does not have an optimum schedule criteria, therefore it is picking the first acceptable schedule. This prevents the necessity of considering all possible combinations which could prove very costly. This situation is analogous to the problem of consistency and validity in logic.

Figure 6:
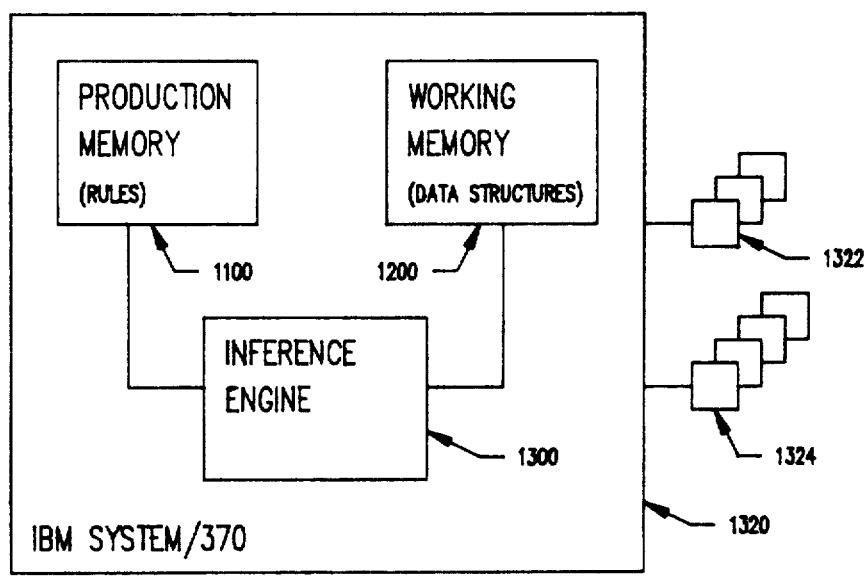
FIG. 6 is a block diagram of the hardware elements of the scheduling system in accordance with the present invention.

FIG. 6 illustrates the general architecture of the expert system environment. The production memory 1100 contains the rules governing the application environment. The working memory 1200 includes the data structures or frames that define pieces of information in the system and the relations between them. The inference engine 1300 follows a simple recognize-resolve-act cycle based on the rules. The inference engine also performs pattern matching based on frame processing. The rules, frames and inference engine reside in the memory of the computer 1320. Users interact with the information through terminals 1322 and personal computers 1324.

Figure 7:
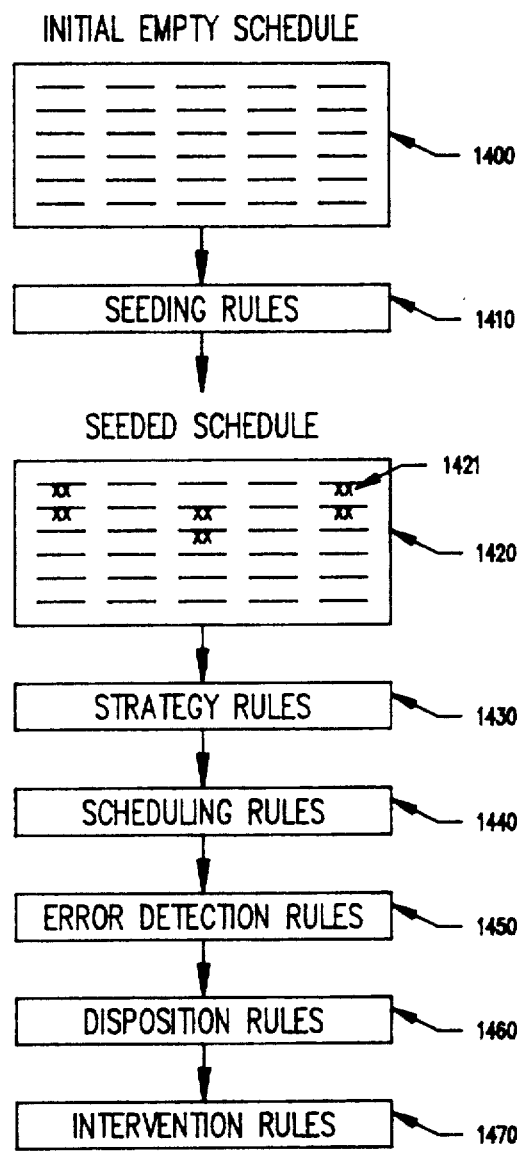
FIG. 7 is a flowchart showing the logic of the scheduling system in accordance with the present invention.

As shown in FIG. 7, the inference engine matches rule premises with data held in the working memory of the computer 1320. The initial schedule data structure 1400 is an array of pointers indicating the times each event should occur, that is the time slot at which specific products are to be processed in the equipment.

Seeding rules 1410 recognize orders that are placed in priority into the initially empty scheduling table 1400. For example, low carbon orders must be processed at the beginning of an active work period. A rule as shown below is provided:

| WHEN | (there is an active work period) |
| | and |
| | (there is a yet unassigned low carbon order) |
| | and |
| | (the beginning of the active work period is not scheduled) |
| THEN | |
| | (place the order at the beginning of this work period) |

The seeding rules, like the one described above, are employed to build the seeded schedule table 1420. In the table "xx" 1421 represents an order placed on the schedule. When all the seeding rules 1410 have been exhausted, then processing proceeds with execution of the strategy rules 1430.

A strategy rule selects a schedule for processing by the scheduling engine. Then, a slot is selected in the schedule table to fill by the scheduling engine. The scheduling engine is shown in FIG. 4 and described earlier in the section entitled Algorithm. If no acceptable schedules are determined, then the disposition criteria are relaxed. The input data of the list of orders to be manufactured are sorted and the inference engine examines the input data for previously successful patterns and preferentially marks the data for selection.

Control flows from the strategy rules 1430 to the scheduling rules 1440. The scheduling rules are used by the scheduling engine described earlier in the section on Algorithm. An example of a scheduling rule is provided below.

| WHEN | (the strategy rules have selected a schedule |
| | and |
| | a slot to be filled on this schedule |
| | and |
| | there are orders not yet assigned to this schedule) |
| THEN | |
| | (generate all possible permutations of this schedule at the chosen slot with the list of orders not yet placed on this particular |

*-continued*
| | schedule) |

From the scheduling rules, control passes to the error detection rules 1450. The error detection rules detect violations of customer-supplied criteria for a good schedule, update error counters associated with each schedule and manage disposition actions such as scheduling deletion when errors are found. An example of an error detection rule is provided below.

| WHEN | (there is a schedule with an error) |
| THEN | |
| | (Add one to the error counter on that schedule which is associated with that error type) |

From the error detection rules 1450, control passes to the disposition rules 1460 to decide what to do with a schedule if one of a set of combinations have occurred and to store away schedules that are unacceptable at the moment to be completed later. This is done in the event the disposition can be relaxed.

Finally control passes to the intervention rules 1470 to stop the program if an acceptable fully complete schedule is determined. If new, high priority, orders appear, then the program is paused to allow the new orders placement on the schedule and to erase all other schedules. The placement of the new orders can be automatic or under user direction. The program can also be paused to await direct user update of a schedule if a user determined program state exists.

IMPLEMENTATION

In FIG. 8 screens from the program are illustrated with slots partially filled. Heats which violate the rules are highlighted (in color in plant displays) and discarded schedules are pointed out with rule violation reasons.

At the start of the program, the schedule operator modifies certain parameters to adjust the rule set as well as the caster downtime, and activate special rules. This is followed by either allowing the operator to seed the schedule or letting the system start with a seed as shown in FIG. 9, FIG. 10, FIG. 11 and FIG. 12.

As the schedule is being built, at certain soft violations, the operator is informed and allowed to intervene to remove the order and enter other orders manually or let the system continue with removing the rule violating orders and creating other schedules.

The cooperative schedule building process continues until the first complete schedule which obeys the rule set is found or until no children can be generated to satisfy the complete rule set and the final incomplete schedule or schedule set is presented to the operator. At the conclusion of the scheduler run the operator may restart with new seeds, relaxed constraints or modify the computer generated schedules as they are built and make multiple runs with the scheduler until a satisfactory solution is found for implementation on the plant.

The seeding process allows the operator to rerun the scheduler in the middle of the week due to either a machine malfunction or arrival of other high priority orders. This facility then provides a comprehensive cooperative scheduling capability for the operator to run at any time and keep up with the dynamic conditions of the plant.

As the schedules are prepared they are then sent to the plant supervisory control software which has the responsibility of communicating the operational instructions to the plant operators or in an ideal situation directly to the unit level computers. The supervisory software maintains the status of daily production and sends the current pending orders to the rule based scheduler so that the schedule operator can run the scheduler at any time.

A source listing of the program in accordance with the subject invention is provided below to elaborate on the detailed logic of the invention.

```
SCHED: PROCEDURE OPTIONS(TOP);

/***************************************************************/
/* NATIONAL STEEL JOB SEQUENCING DEMO                          */
/*                                                             */
/*                                                             */
/* SIMPLE DEMO TO SCHEDULE A CONTINUOUS POUR STEEL MAKING      */
/*                                                             */
/* PROCESS                                                     */
/*                                                             */
/* SCHEME:                                                     */
/*                                                             */
/* 1. READ THE ORDERS FROM A FILE.                             */
/* 2. PROMPT THE USER FOR DOWNTIMES.                           */
/* 3. ALLOCATE AN INITIAL SCHEDULE THAT CONTAINS THOSE DOWNTIMES. */
/*    SCHEDULES CONTAIN AN ARRAY OF 40 SELECTORS THAT POINT TO */
/*    THE ORDERS FOR EACH TIME SLOT. INITIALLY THE SELECTORS   */
/*    POINT TO A DUMMY (PRODUCT='') ORDER FOR NON_DOWNTURN SLOTS. */
/*    FOR THE CASE OF DOWNTURN SLOTS, THE SELECTORS POINT TO A */
/*    DUMMY (PRODUCT = 'XXX') ORDER                            */
/* 4. USE RULES TO IDENTIFY THE LOW CARBON ORDERS              */
/* 5. USE HIGH PRIORITY RULES TO ASSIGN ALL LOW CARBON ORDERS  */
/*    TO THE START OF TRANSITIONS. USE THE TRANSITION OBJECTS  */
/*    TO STORE THE NUMBER, START AND END SLOT LOCATIONS OF THE */
/*    TRANSITIONS. THE TRANSITIONS ARE DEFINED IN THIS PROGRAM */
/*    AS PERIODS BETWEEN DOWNTIMES.                            */
/* 6. USE HIGH PRIORITY RULES TO PLACE THE ORDER WITH THE HIGHEST */
/*    CARBON LEVEL AT THE END OF THE TRANSITION WITH THE LONGEST */
/*    TIME SPAN.                                               */
/* 7. NOW THAT THE INITIAL SCHEDULE HAS BEEN FILLED IN USING   */
/*    HEURISTICS, GENERATE A NEW SET OF SCHEDULES THAT CONTAIN */
/*    ALL POSSIBLE COMBINATIONS OF ORDERS IN THE NEXT AVAILABLE */
```

```
/*   SLOT THAT DO NOT VIOLATE THE CARBON INCREASING AND WIDTH   */
/*   DECREASING PROSCRIPTION.                                   */
/*   FREE THE INITIAL SCHEDULE WHEN ITS DESCENDANTS HAVE BEEN   */
/*   GENERATED (DESCENDANTS BEING NEW COPIES OF THE SCHEDULE    */
/*   THAT CONTAIN ONE MORE SLOT FILLED IN). FREE THE INITIAL    */
/*   OR PARENT SCHEDULE.                                        */
/* 8. USE HIGH PRIORITY RULES TO DETECT NOGOOD SCHEDULE CONDITIONS */
/*   (MORE THAN ONE RUN OF SPECIALS IN A DAY, WIDTH DECREASING  */
/*    BY MORE THAN A GIVEN MAXMIUM, PLACEMENT OF 401-TYPE       */
/*    ORDERS, ETC.).                                            */
/* 9. USE HIGH PRIORITY RULE TO FREE NOGOOD SCHEDULE AS SOON AS */
/*    THEY ARE GENERATED TO AVOID OVERWHELMING WORKING MEMORY.  */
/* 10. CONTINUE TO EXHAUSTIVELY GENERATE NEW DESCENDANT SCHEDULES */
/*    UNTIL ALL SLOT ARE FILLED.                                */
/* 11. USE RULES TO PRESENT THE USER WITH A LIST OF GOOD SCHEDULES */
/*    OR A SINGLE SCHEDULE. A GOOD SCHEDULE HAS ALL ITS SLOTS   */
/*    FILLED AND IS STILL HAS A STATUS OF 'GOOD'.               */
/* 12. IF ALL SCHEDULE ARE 'NOGOOD' THEN SHOW THE USER THE SCHEDULE */
/*    OR SCHEDULES WITH THE LEAST OBJECTIONABLE VIOLATIONS      */
/*                                                              */
/*                                                              */
/*                                                              */
/*      DICK DAMIAN/MANESH SHAH     9/23/88 - 12/13/88          */
/*                                                              */
/****************************************************************/

%INCLUDE GRAPHICS;

DCL 1 ORDER CLASS GLOBAL,
    2 NUMBER     FIXED DECIMAL(2),   /* ORDER NUMBER         */
    2 ID         CHAR(2) VARYING,    /* CHAR(ORDER.NUMBER)   */
    2 DESCRIPT   CHAR(12) VARYING,   /* 101/90/150/Y         */
    2 CARBON_LEVEL FIXED DECIMAL(6,3), /* POINTS OF CARBON   */
    2 PRODUCT CHAR(3) VARYING,       /* PRODUCT DESIGNATION  */
    2 WIDTH   FIXED DECIMAL(2),      /* WIDTH OF SLAB        */
    2 LOW_CARBON BIT(1),             /* IF LC THEN '1'B      */
    2 SPECIAL BIT(1),                /* IF SPECIAL THEN '1'B */
```

```
  2 ASSIGNED BIT(1);           /* FLAG THAT INDICATES THAT */
                               /* THIS ORDER IS FOREVER    */
                               /* ASSIGNED - LOW CARB ORDS */

DCL 1 SCHEDULE CLASS GLOBAL,   /* WEEKLY SCHEDULE          */
    2 NUMBER    FIXED DECIMAL(5), /* TRIAL SCHEDULE NUMBER */
    2 STATUS    CHAR(8) VARYING,  /* GOOD OR NOGOOD SCHEDULE */

2 LAST_SLOT_FILLED
      FIXED DECIMAL(2),
    2 NEXT_SLOT_AVAILABLE
      FIXED DECIMAL(2),
    2 BAD_SLOT                 /* SLOT NUMBER OF LATEST ERROR */
      FIXED DECIMAL(2),
    2 ORDER_LIST CHAR(130) VARYING, /* LIST OF ORDERS NUMS FILLED */

2 ID(40),
      3 ORDER SELECTOR,        /* POINT TO ORDERS BY SLOT NUM */
    2 CARBON_DECREASING_ERRORS FIXED DECIMAL(2),
    2 WIDTH_INCREASING_ERRORS  FIXED DECIMAL(2),
    2 WIDTH_DELTA_ERRORS       FIXED DECIMAL(2),
    2 SPECIAL_ORDER_ERRORS     FIXED DECIMAL(2),
    2 NITE_TURN_SPECIAL_ERRORS FIXED DECIMAL(2),
    2 FOUR_O_ONE_ERRORS        FIXED DECIMAL(2),
    2 LOW_CARBON_ERRORS        FIXED DECIMAL(2),
    2 ERROR_MESSAGE            CHAR(60) VARYING;

DCL 1 TRANSITION CLASS GLOBAL,  /* NON-DOWN PERIODS */
    2 START FIXED DECIMAL(2),
    2 END   FIXED DECIMAL(2);

DCL 1 GOAL   CLASS GLOBAL,
    2 DESCRIPT CHAR(30) VARYING;

DCL (D,G,O,O1,O2,W,T,SS,S1) SELECTOR STATIC;

DCL NULL     BUILTIN,
    INDEX    BUILTIN,
    LENGTH   BUILTIN,
    GMT      BUILTIN,
    CHARTIM  BUILTIN,
    SUBSTR   BUILTIN,
    CHAR     BUILTIN,
    STRING   BUILTIN,
    TRANSLATE BUILTIN,
    MATCH    BUILTIN,
    SUCC     BUILTIN,
    MOD      BUILTIN;

DCL EOF BIT(1) INITIAL('0'B) STATIC;

DCL (KEY,MODE,COUNT) FIXED BINARY(31) STATIC; /* FOR ASREAD */
```

```
DCL ORDERS FILE INPUT,
  TOFILE FILE OUTPUT,
  TERM  FILE OUTPUT,
  TUBE  FILE INPUT,
/* SYSIN FILE INPUT, */
  SYSOUT FILE OUTPUT,
  DISPLAY_ALMOST_COMPLETE CHAR(1) STATIC INITIAL('Y') GLOBAL,

PROD CHAR(3),
  WID  FIXED DECIMAL(2),
  WIDTH_CHANGE_MAX FIXED DECIMAL(2) STATIC INITIAL(4),

QUAN FIXED DECIMAL(1),
  PTS_CARBON FIXED DECIMAL(3),
  SPECIAL CHAR(1),
  MESSAGE CHAR(70),
  NUMBER_ORDERS FIXED DECIMAL(2) STATIC,
  SCHEDULE_CREATED BIT(1) STATIC,
  SCHEDULE_COUNTER FIXED DECIMAL(6) STATIC INITIAL(1),
  SCHEDULES_FREED FIXED DECIMAL(6) STATIC INITIAL(0),
  NINEBYTE CHAR(9) STATIC,
  THREEBYTE CHAR(3) STATIC,
  TWOBYTE CHAR(2) STATIC,
  TWO_BYTES_MAX CHAR(2) VARYING STATIC,
  ONEBYTE CHAR(1) STATIC,
  H   FIXED DECIMAL(2) STATIC,
  I   FIXED DECIMAL(2) STATIC,
  J   FIXED DECIMAL(2) STATIC,
  K   FIXED DECIMAL(2) STATIC,
  L   FIXED DECIMAL(2) STATIC,
  II  FIXED DECIMAL(3) STATIC,
  P   DEC FLOAT(6)   STATIC,
  CHAR12 CHAR(12) VARYING,
  CHAR4 PIC'9999',
  CHAR3 PIC'999',
  CHAR2 PIC'99',
  CHAR1 PIC'9',
  WIDTH_CHANGE_ANS CHAR(2) INITIAL('04'),
  CHAR9 PIC'ZZZZZZZZ9',
  CHAR65 CHAR(65) VARYING,
  START CHAR(130) VARYING,
  REST  CHAR(130) VARYING,
  WAIT_DEMO_CONTINUE CHAR(1),
  MON_DAY CHAR(1) STATIC GLOBAL,
  MON_NITE CHAR(1) STATIC GLOBAL,
  TUE_DAY CHAR(1) STATIC GLOBAL,
  TUE_NITE CHAR(1) STATIC GLOBAL,
  WED_DAY CHAR(1) STATIC GLOBAL,
  WED_NITE CHAR(1) STATIC GLOBAL,
  THU_DAY CHAR(1) STATIC GLOBAL,
  THU_NITE CHAR(1) STATIC GLOBAL,
  FRI_DAY CHAR(1) STATIC GLOBAL,
```

```
FRI_NITE CHAR(1) STATIC GLOBAL,
TIME_START FLOAT BIN(53) INITIAL(0) STATIC GLOBAL,
TIME_END   FLOAT BIN(53) INITIAL(0) STATIC GLOBAL,
TIME_ELAPSED FLOAT BIN(53) INITIAL(0) STATIC GLOBAL,
TIME_CHAR  CHAR(9)    STATIC GLOBAL,
ASSIGNED BIT STATIC ,
FLAG   BIT STATIC ,
SHOW_USER_FLAG1 BIT STATIC INITIAL('1'B),
SHOW_USER_FLAG2 BIT STATIC INITIAL('1'B),
ALTERNATE_WIDTH_FLAG CHAR(1) INITIAL('N') STATIC GLOBAL,

TRUE BIT STATIC INITIAL('1'B),
FALSE BIT STATIC INITIAL('0'B),
HORIZ_BAR CHAR(60) STATIC INITIAL((61)'*'),
SHIFT FIXED DECIMAL(1) STATIC GLOBAL,
DAY CHAR(10) VARYING STATIC GLOBAL,
TURN_START FIXED DECIMAL(2) STATIC GLOBAL,
TURN_END   FIXED DECIMAL(2) STATIC GLOBAL,
DAY_START FIXED DECIMAL(2) STATIC GLOBAL,
DAY_END   FIXED DECIMAL(2) STATIC GLOBAL,
SHIFT_POSITION FIXED DECIMAL(1),
VERBOSE_PRINT CHAR(1) INITIAL('N') STATIC GLOBAL,
MAX_NITE_TURN_SPECIALS FIXED DECIMAL(1) STATIC GLOBAL,

MAX_NITE_TURN_SPECIALS_ANS CHAR(1) INITIAL('0'),
MANUAL_CHANGE CHAR(1) VARYING STATIC GLOBAL,
SLOT1 FIXED DECIMAL(2) STATIC GLOBAL,
SLOT2 FIXED DECIMAL(2) STATIC GLOBAL,
SLOT_NUMBER FIXED DECIMAL(2) STATIC GLOBAL,
HARDCOPY CHAR(1) INITIAL('Y') STATIC GLOBAL,
SPACE CHAR(74) VARYING;

ON ENTRY
 BEGIN;

ON ENDFILE(ORDERS)
    BEGIN;
    EOF = '1'B;
    END; /* END ON ENDFILE BEGIN BLOCK */

PUT FILE(TERM).EDIT('HIT ENTER TO START DEMO') (SKIP,X(30),A);
GET FILE(TUBE) EDIT(WAIT_DEMO_CONTINUE) (A(1));

DISPLAY('      ******************************************');
DISPLAY('      ** NATIONAL STEEL PLANT SCHEDULER DEMO  **');
DISPLAY('      ******************************************');

PUT FILE(TERM) EDIT('RAW ORDER LISTING','PRODUCT','WIDTH','QUANTITY',

'PTS CARBON','SPECIAL')
  (SKIP(5),X(28),A,SKIP,X(20),A,X(9),A,X(5),A,X(5),A,X(4),A);
```

```
NUMBER_ORDERS=0;
J=0;
DO UNTIL(EOF);
  GET FILE(ORDERS) EDIT(PROD,WID,QUAN,PTS_CARBON,SPECIAL,SPACE)

(A(3),X(7),F(2),X(8),F(1),X(9),F(3),X(7),A(1),A(39));

IF EOF THEN LEAVE;
IF QUAN=1
  THEN DO;
    J=J+1;
    PUT SKIP FILE(TERM) EDIT(J,PROD,WID,QUAN,PTS_CARBON,SPECIAL)

(X(10),F(2),X(14),A(3),
      X(7),F(2),X(8),F(1),X(12),F(3),X(13),A(1));
    ALLOCATE ORDER   SET(O);
    O=>ORDER.NUMBER    = J;
    CHAR2          = J;
    O=>ORDER.ID        = CHAR2;
    O=>ORDER.CARBON_LEVEL= PTS_CARBON;
    O=>ORDER.PRODUCT = PROD;
    O=>ORDER.WIDTH   = WID;
    O=>ORDER.LOW_CARBON = FALSE;
    O=>ORDER.ASSIGNED  = FALSE;
    IF SPECIAL='Y' THEN O=>ORDER.SPECIAL = '1'B;
         ELSE O=>ORDER.SPECIAL = '0'B;
    NUMBER_ORDERS=NUMBER_ORDERS+1;
    CHAR3 = O=>ORDER.PRODUCT;
    CHAR12 =CHAR3||'/';
    CHAR2 = O=>ORDER.WIDTH;
    CHAR12 =CHAR12||CHAR2||'/';
    CHAR3 = O=>ORDER.CARBON_LEVEL;
    IF O=>ORDER.SPECIAL = TRUE
      THEN CHAR12 =CHAR12||CHAR3||'/Y';
      ELSE CHAR12 =CHAR12||CHAR3||'/N';
    O=>ORDER.DESCRIPT = CHAR12;
    END; /* QUAN=1 DO BLOCK */
ELSE DO I=1 TO QUAN;
    J=J+1;
    PUT SKIP FILE(TERM) EDIT(J,PROD,WID,QUAN,PTS_CARBON,SPECIAL)

(X(10),F(2),X(14),A(3),
      X(7),F(2),X(8),F(1),X(12),F(3),X(13),A(1));
    ALLOCATE ORDER   SET(O);
    O=>ORDER.NUMBER    = J;
    CHAR2          = J;
    O=>ORDER.ID        = CHAR2;
    O=>ORDER.CARBON_LEVEL= PTS_CARBON;
    O=>ORDER.PRODUCT = PROD;
    O=>ORDER.WIDTH   = WID;
    O=>ORDER.LOW_CARBON = FALSE;
    O=>ORDER.ASSIGNED  = FALSE;
```

```
       IF SPECIAL='Y' THEN O=>ORDER.SPECIAL = '1'B;
             ELSE O=>ORDER.SPECIAL = '0'B;
       NUMBER_ORDERS=NUMBER_ORDERS+1;
       CHAR3 = O=>ORDER.PRODUCT;
       CHAR12 =CHAR3||'/';
       CHAR2 = O=>ORDER.WIDTH;
       CHAR12 =CHAR12||CHAR2||'/';
       CHAR3 = O=>ORDER.CARBON_LEVEL;
       IF O=>ORDER.SPECIAL = TRUE
         THEN CHAR12 =CHAR12||CHAR3||'/Y';
         ELSE CHAR12 =CHAR12||CHAR3||'/N';
       O=>ORDER.DESCRIPT = CHAR12;
       END;  /* END QUAN > 1 DO LOOP */
 END;  /* END THE DO WHILE LOOP FOR READING FILE */
 PUT FILE(TERM)
    EDIT(NUMBER_ORDERS,' ORDERS WERE READ FROM THE INPUT FILE')

(SKIP,F(2),A);

PUT FILE(TERM) EDIT('HIT ENTER TO CONTINUE') (SKIP(3),X(30),A);
GET FILE(TUBE) EDIT(WAIT_DEMO_CONTINUE) (A(1));

/* ALLOCATE AN ORDER WITH WIDTH=0 AND PRODUCT='' FOR PRINTING */

ALLOCATE ORDER   SET(O);
O=>ORDER.NUMBER    = 0;
O=>ORDER.ID        = '00';
O=>ORDER.CARBON_LEVEL= 0;
O=>ORDER.PRODUCT = '';
O=>ORDER.WIDTH   = 0;
O=>ORDER.LOW_CARBON = FALSE;
O=>ORDER.ASSIGNED   = FALSE;
O=>ORDER.SPECIAL = '0'B;
O=>ORDER.DESCRIPT = '          ';
 ALLOCATE SCHEDULE SET(W);
 W=>SCHEDULE.NUMBER= 1;
 W=>SCHEDULE.STATUS = 'GOOD';
 W=>SCHEDULE.ORDER_LIST = '';
 W=>SCHEDULE.BAD_SLOT  = 0;
 W=>SCHEDULE.LAST_SLOT_FILLED = 0;
 W=>SCHEDULE.NEXT_SLOT_AVAILABLE    = 1;
 DO I=1 TO 40;
 W=>SCHEDULE.ID(I).ORDER = O;
    END;              /* END DO I LOOP        */
 W=>CARBON_DECREASING_ERRORS =0;
 W=>WIDTH_INCREASING_ERRORS =0;
 W=>WIDTH_DELTA_ERRORS     =0;
 W=>SPECIAL_ORDER_ERRORS   =0;
 W=>NITE_TURN_SPECIAL_ERRORS =0;
 W=>FOUR_O_ONE_ERRORS     =0;
 W=>LOW_CARBON_ERRORS      =0;
 W=>ERROR_MESSAGE         ='';
```

```
/* ALLOCATE A MARKER ORDER FOR THE DOWN TURN SLOTS */

ALLOCATE ORDER    SET(O);
O=>ORDER.NUMBER       = 0;
O=>ORDER.ID           = '00';
O=>ORDER.CARBON_LEVEL = 0;
O=>ORDER.PRODUCT      = 'XXX';
O=>ORDER.WIDTH        = 0;
O=>ORDER.LOW_CARBON   = FALSE;
O=>ORDER.ASSIGNED     = FALSE;
O=>ORDER.SPECIAL      = '0'B;
O=>ORDER.DESCRIPT     = 'XXXXXXXXXXXX';

CALL FSINIT;
CALL GSLSS(2,'ADMUVCRP',199);

CALL GSCS(199);
CALL GSWIN(0.0,100.0,0.0,100.0);   /* NOTE NOT ASPECT 1:1 */

CALL GSSEG(1);     /* create segment */
CALL GSCM(1);      /* set to mode 1 */

/* DRAW BORDER */
CALL GSMOVE(1 ,15);
CALL GSLINE(1 ,75);
CALL GSLINE(85,75);
CALL GSLINE(85,15);
CALL GSLINE(1 ,15);

CALL ASDFLD(101, 10, 5,1, 36,2);
CALL ASFCOL(101,5);
CALL ASCPUT(101,36,
     'PLACE AN X AT THE DOWNTURN LOCATIONS');
CALL ASDFLD(100, 11, 5,1, 13,2);
CALL ASFCOL(100,5);
CALL ASCPUT(100,13,
     '  DAY NIGHT');
CALL ASDFLD(102, 12, 10,1, 1,0);
CALL ASFCOL(102,6);
CALL ASCPUT(102,1,'_');
CALL ASDFLD(103, 13, 10,1, 1,0);
CALL ASFCOL(103,6);
CALL ASCPUT(103,1,'_');
CALL ASDFLD(104, 14, 10,1, 1,0);
CALL ASFCOL(104,6);
CALL ASCPUT(104,1,'_');
CALL ASDFLD(105, 15, 10,1, 1,0);
CALL ASFCOL(105,6);
CALL ASCPUT(105,1,'_');
CALL ASDFLD(106, 16, 10,1, 1,0);
CALL ASFCOL(106,6);
CALL ASCPUT(106,1,'X');
```

```
CALL ASDFLD(107, 12, 15,1, 1,0);
CALL ASFCOL(107,6);
CALL ASCPUT(107,1,'_');
CALL ASDFLD(108, 13, 15,1, 1,0);
CALL ASFCOL(108,6);
CALL ASCPUT(108,1,'X');
CALL ASDFLD(109, 14, 15,1, 1,0);
CALL ASFCOL(109,6);
CALL ASCPUT(109,1,'_');
CALL ASDFLD(110, 15, 15,1, 1,0);
CALL ASFCOL(110,6);
CALL ASCPUT(110,1,'_');
CALL ASDFLD(111, 16, 15,1, 1,0);
CALL ASFCOL(111,6);
CALL ASCPUT(111,1,'_');
CALL ASDFLD(112, 12, 25,1, 10,2);
CALL ASFCOL(112,5);
CALL ASCPUT(112,6,'MONDAY');
CALL ASDFLD(113, 13, 25,1, 10,2);
CALL ASFCOL(113,5);
CALL ASCPUT(113,7,'TUESDAY');
CALL ASDFLD(114, 14, 25,1, 10,2);
CALL ASFCOL(114,5);
CALL ASCPUT(114,9,'WEDNESDAY');
CALL ASDFLD(115, 15, 25,1, 10,2);
CALL ASFCOL(115,5);
CALL ASCPUT(115,8,'THURSDAY');
CALL ASDFLD(116, 16, 25,1, 10,2);
CALL ASFCOL(116,5);
CALL ASCPUT(116,6,'FRIDAY');
CALL ASDFLD(117, 17, 5,1, 46,2);
CALL ASFCOL(117,5);
CALL ASCPUT(117,46,
    'WHAT IS THE MAXMIMUM ACCEPTABLE WIDTH CHANGE ?');

CALL ASDFLD(137, 17, 60,1, 2,1);
CALL ASFCOL(137,6);
CALL ASCPUT(137,2,WIDTH_CHANGE_ANS);

CALL ASFCUR(137,1,2);

CALL ASDFLD(118, 18, 5,1, 53,2);
CALL ASFCOL(118,5);
CALL ASCPUT(118,53,
    'SHOULD THE ALTERNATE WIDTH RULE BE ACTIVATED ? (Y/N)');

CALL ASDFLD(138, 18, 61,1, 1,0);
CALL ASFCOL(138,6);
CALL ASCPUT(138,1,ALTERNATE_WIDTH_FLAG);
CALL ASDFLD(119, 19, 5,1, 50,2);
CALL ASFCOL(119,5);
CALL ASCPUT(119,50,
```

```
            'DO YOU WANT TO DIRECT THE OUTPUT TO A FILE ? (Y/N)');
CALL ASDFLD(139, 19, 61,1, 1,0);
CALL ASFCOL(139,6);
CALL ASCPUT(139,1,HARDCOPY);
CALL ASDFLD(120, 20, 5,1, 40,2);
CALL ASFCOL(120,5);
CALL ASCPUT(120,37,
            'DO YOU WISH TO PRINT VERBOSELY? (Y/N)');
CALL ASDFLD(140, 20, 61,1, 1,0);
CALL ASFCOL(140,6);
CALL ASCPUT(140,1,VERBOSE__PRINT);
CALL ASDFLD(121, 21, 5,1, 40,2);
CALL ASFCOL(121,5);
CALL ASCPUT(121,37,
            'MAXIMUM ALLOWABLE NIGHT TURN SPECIALS');
CALL ASDFLD(141, 21, 61,1, 1,0);
CALL ASFCOL(141,6);
CALL ASCPUT(141,1,MAX__NITE__TURN__SPECIALS__ANS);

CALL ASDFLD(201, 30, 25,1, 30,2);
CALL ASFCOL(201,5);
CALL ASCPUT(201,30,
            'UPDATE MENU AND THEN HIT ENTER');

CALL ASREAD(KEY,MODE,COUNT);

CALL ASCGET(102,1,MON__DAY);
MON__DAY=TRANSLATE(MON__DAY,'X','x');

CALL ASCGET(107,1,MON__NITE);
MON__NITE=TRANSLATE(MON__NITE,'X','x');

CALL ASCGET(103,1,TUE__DAY);
TUE__DAY=TRANSLATE(TUE__DAY,'X','x');

CALL ASCGET(108,1,TUE__NITE);
TUE__NITE=TRANSLATE(TUE__NITE,'X','x');

CALL ASCGET(104,1,WED__DAY);
WED__DAY=TRANSLATE(WED__DAY,'X','x');

CALL ASCGET(109,1,WED__NITE);
WED__NITE=TRANSLATE(WED__NITE,'X','x');

CALL ASCGET(105,1,THU__DAY);
THU__DAY=TRANSLATE(THU__DAY,'X','x');

CALL ASCGET(110,1,THU__NITE);
THU__NITE=TRANSLATE(THU__NITE,'X','x');

CALL ASCGET(106,1,FRI__DAY);
FRI__DAY=TRANSLATE(FRI__DAY,'X','x');
```

```
CALL ASCGET(111,1,FRI_NITE);
FRI_NITE=TRANSLATE(FRI_NITE,'X','x');

CALL ASCGET(137,2,WIDTH_CHANGE_ANS);
CHAR2=TRANSLATE(WIDTH_CHANGE_ANS,'0','_');
WIDTH_CHANGE_MAX = CHAR2;

CALL ASCGET(138,1,ALTERNATE_WIDTH_FLAG);
ALTERNATE_WIDTH_FLAG = TRANSLATE(ALTERNATE_WIDTH_FLAG,

'ABCDEFGHIJKLMNOPQRSTUVWXYZ',
        'abcdefghijklmnopqrstuvwxyz');

CALL ASCGET(139,1,HARDCOPY);
HARDCOPY      = TRANSLATE(HARDCOPY,
        'ABCDEFGHIJKLMNOPQRSTUVWXYZ',
        'abcdefghijklmnopqrstuvwxyz');

CALL ASCGET(141,1,MAX_NITE_TURN_SPECIALS_ANS);
CHAR1=TRANSLATE(MAX_NITE_TURN_SPECIALS_ANS,'0','_');

MAX_NITE_TURN_SPECIALS = CHAR1;
CALL ASCGET(140,1,VERBOSE_PRINT);
VERBOSE_PRINT =
TRANSLATE(VERBOSE_PRINT,'ABCDEFGHIJKLMNOPQRSTUVWXYZ',
                'abcdefghijklmnopqrstuvwxyz');

CALL FSPCLR;   /* CLEAR OUT ALL FIELDS NOT JUST THEIR CONTENTS ! */

IF MON_DAY='X'
        THEN DO;
            W=>SCHEDULE.ID( 1).ORDER=0;
            W=>SCHEDULE.ID( 2).ORDER=0;
            W=>SCHEDULE.ID( 3).ORDER=0;
            W=>SCHEDULE.ID( 4).ORDER=0;
            END;
IF MON_NITE='X'
        THEN DO;
            W=>SCHEDULE.ID( 5).ORDER=0;
            W=>SCHEDULE.ID( 6).ORDER=0;
            W=>SCHEDULE.ID( 7).ORDER=0;
            W=>SCHEDULE.ID( 8).ORDER=0;
            END;
IF TUE_DAY='X'
        THEN DO;
            W=>SCHEDULE.ID( 9).ORDER=0;
            W=>SCHEDULE.ID(10).ORDER=0;
            W=>SCHEDULE.ID(11).ORDER=0;
            W=>SCHEDULE.ID(12).ORDER=0;
            END;
IF TUE_NITE='X'
        THEN DO;
```

```
                W=>SCHEDULE.ID(13).ORDER=0;
                W=>SCHEDULE.ID(14).ORDER=0;
                W=>SCHEDULE.ID(15).ORDER=0;
                W=>SCHEDULE.ID(16).ORDER=0;
                END;
IF WED_DAY='X'
        THEN DO;
                W=>SCHEDULE.ID(17).ORDER=0;
                W=>SCHEDULE.ID(18).ORDER=0;
                W=>SCHEDULE.ID(19).ORDER=0;
                W=>SCHEDULE.ID(20).ORDER=0;
                END;
IF WED_NITE='X'
        THEN DO;
                W=>SCHEDULE.ID(21).ORDER=0;
                W=>SCHEDULE.ID(22).ORDER=0;
                W=>SCHEDULE.ID(23).ORDER=0;
                W=>SCHEDULE.ID(24).ORDER=0;
                END;
IF THU_DAY='X'
        THEN DO;
                W=>SCHEDULE.ID(25).ORDER=0;
                W=>SCHEDULE.ID(26).ORDER=0;
                W=>SCHEDULE.ID(27).ORDER=0;
                W=>SCHEDULE.ID(28).ORDER=0;
                END;
IF THU_NITE='X'
        THEN DO;
                W=>SCHEDULE.ID(29).ORDER=0;
                W=>SCHEDULE.ID(30).ORDER=0;
                W=>SCHEDULE.ID(31).ORDER=0;
                W=>SCHEDULE.ID(32).ORDER=0;
                END;
IF FRI_DAY='X'
        THEN DO;
                W=>SCHEDULE.ID(33).ORDER=0;
                W=>SCHEDULE.ID(34).ORDER=0;
                W=>SCHEDULE.ID(35).ORDER=0;
                W=>SCHEDULE.ID(36).ORDER=0;
                END;
IF FRI_NITE='X'
        THEN DO;
                W=>SCHEDULE.ID(37).ORDER=0;
                W=>SCHEDULE.ID(38).ORDER=0;
                W=>SCHEDULE.ID(39).ORDER=0;
                W=>SCHEDULE.ID(40).ORDER=0;
                END;

K=1;
H=1;
DO WHILE(H < 40);
  DO H=K TO 40;
```

```
IF W=>SCHEDULE.ID(H).ORDER=>ORDER.PRODUCT='XXX'

THEN LEAVE;
END;
ALLOCATE TRANSITION SET(T);
T=>TRANSITION.START=K;
IF H=40 THEN T=>TRANSITION.END =40;
     ELSE T=>TRANSITION.END =H-1;
K=H+4;
END;

ALLOCATE GOAL SET(G);
G=>GOAL.DESCRIPT='ASSIGN LOW CARB';
CALL ASDFLD(1,   20,  1,1, 12,2);
CALL ASDFLD(2,   21,  1,1, 12,2);
CALL ASDFLD(3,   22,  1,1, 12,2);
CALL ASDFLD(4,   23,  1,1, 12,2);
CALL ASDFLD(5,   24,  1,1, 12,2);
CALL ASDFLD(6,   25,  1,1, 12,2);
CALL ASDFLD(7,   26,  1,1, 12,2);
CALL ASDFLD(8,   27,  1,1, 12,2);
CALL ASDFLD(9,   28,  1,1, 12,2);
CALL ASDFLD(10,  29,  1,1, 12,2);
CALL ASDFLD(11,  20, 15,1, 12,2);
CALL ASDFLD(12,  21, 15,1, 12,2);
CALL ASDFLD(13,  22, 15,1, 12,2);
CALL ASDFLD(14,  23, 15,1, 12,2);
CALL ASDFLD(15,  24, 15,1, 12,2);
CALL ASDFLD(16,  25, 15,1, 12,2);
CALL ASDFLD(17,  26, 15,1, 12,2);
CALL ASDFLD(18,  27, 15,1, 12,2);
CALL ASDFLD(19,  28, 15,1, 12,2);
CALL ASDFLD(20,  29, 15,1, 12,2);
CALL ASDFLD(21,  20, 30,1, 12,2);
CALL ASDFLD(22,  21, 30,1, 12,2);
CALL ASDFLD(23,  22, 30,1, 12,2);
CALL ASDFLD(24,  23, 30,1, 12,2);
CALL ASDFLD(25,  24, 30,1, 12,2);
CALL ASDFLD(26,  25, 30,1, 12,2);
CALL ASDFLD(27,  26, 30,1, 12,2);
CALL ASDFLD(28,  27, 30,1, 12,2);
CALL ASDFLD(29,  28, 30,1, 12,2);
CALL ASDFLD(30,  29, 30,1, 12,2);
CALL ASDFLD(31,  20, 45,1, 12,2);
CALL ASDFLD(32,  21, 45,1, 12,2);
CALL ASDFLD(33,  22, 45,1, 12,2);
CALL ASDFLD(34,  23, 45,1, 12,2);
CALL ASDFLD(35,  24, 45,1, 12,2);
CALL ASDFLD(36,  25, 45,1, 12,2);
CALL ASDFLD(37,  26, 45,1, 12,2);
CALL ASDFLD(38,  27, 45,1, 12,2);
```

```
CALL ASDFLD(39, 28, 45,1, 12,2);
CALL ASDFLD(40, 29, 45,1, 12,2);
CALL ASDFLD(88, 30, 10,1, 60,2);
CALL ASDFLD(89, 31, 10,1, 60,2);
CALL ASDFLD(90, 31, 73,1, 2,0);
CALL ASDFLD(91, 32, 10,1, 60,2);
CALL ASFCOL(88,5);
CALL ASFCOL(89,3);
CALL ASFCOL(90,3);
CALL ASFCOL(91,5);
CALL ASCPUT(89,40,'HERE IS THE INITIAL SCHEDULE...HIT ENTER');
CALL WKLYG(W,'W');
TIME_START = GMT;
/* GRAPHICS DEFINES FOR SCHEDULER ENGINE MESSAGES */
CALL ASDFLD(998, 11, 10,1, 41,0);
CALL ASFCOL(998,5);
CALL ASDFLD(999, 11, 54,1, 9,0);
CALL ASFCOL(999,5);
END;                /* END ON ENTRY        */

/* ************************************************* */
/* **********    RULES BEGIN    ********************* */
/* ************************************************* */

IDENTIFY_101_AS_LC:
/* ************************************************* */
/* INDENTIFY THE LOW CARBON ORDERS BY FILLING THE LOW CARBON
*/
/* ATTRIBUTE OF THE ORDER CLASS...              */
/* IF(THERE IS A ORDER OF PRODUCT TYPE 101)     */
/* ************************************************* */
WHEN(PRIOR500,
    Y1=>ORDER(Y1=>ORDER.PRODUCT='101',
        Y1=>LOW_CARBON = FALSE)
    )
 BEGIN;
  Y1=>LOW_CARBON = TRUE;
 END;

IDENTIFY_201_AS_LC:
/* ************************************************* */
/* INDENTIFY THE LOW CARBON ORDERS BY FILLING THE LOW CARBON
*/
/* ATTRIBUTE OF THE ORDER CLASS...              */
/* IF(THERE IS A ORDER OF PRODUCT TYPE '201)    */
/* ************************************************* */
WHEN(PRIOR500,
    Y1=>ORDER(Y1=>ORDER.PRODUCT='201',
        Y1=>LOW_CARBON = FALSE)
    )
```

```
BEGIN;
 Y1=>LOW_CARBON = TRUE;
END;

GENERATE_ALTERNATE_SCHEDULES:
/* ************************************************************ */
/* THE SCHEME IS THE FOLLOWING:                                  */
/*                                                               */
/* AFTER THE FIRST SCHEDULE HAS BEEN FILLED WITH LOW CARBON
ORDERS */
/* (BECAUSE THE RULES THAT DO THAT ARE HIGH PRIORITY), THEN MAKE
*/
/* COPIES OF THE SCHEDULE AND FILL THE NEXT AVAILABLE POSITION   */
/* OF THESE COPIES WITH ORDERS THAT WILL NOT VIOLATE THE CARBON-
*/
/* INCREASING AND WIDTH DECREASING PROSCRIPTION. AFTER THE COPIES
*/
/* HAVE BEEN GENERATED, FREE THE PARENT SCHEDULE FROM WHICH THEY
*/
/* WERE COPIED. HIGH PRIORITY RULES LOOK FOR RULE VIOLATIONS,    */
/* SUCH AS PLACEMENT OF SPECIALS. IF THESE RULES FIND VIOLATIONS, */
/* THEY WILL MARK THE SCHEDULE "NOGOOD" AND A HIGH PRIORITY RULE
*/
/* WILL FREE THEM.                                               */
/* THE SECOND PATTERN IN THE LHS OF THE RULE IS AN ATTEMPT TO FILL
*/
/* THE MOST DENSELY FILLED SCHEDULES PREFERENTLY OVER THE MOST
*/
/* RECENT ONES.                                                  */
/* ************************************************************ */
WHEN(PRIOR010,
    S=>SCHEDULE(S=>SCHEDULE.STATUS='GOOD',
            S=>SCHEDULE.NEXT_SLOT_AVAILABLE ^= 0) &
    ^B=>SCHEDULE(B=>SCHEDULE.STATUS='GOOD',
            B=>SCHEDULE.NEXT_SLOT_AVAILABLE ^= 0,
            B=>SCHEDULE.LAST_SLOT_FILLED >
            S=>SCHEDULE.LAST_SLOT_FILLED )
    )
  BEGIN;
   SCHEDULE_CREATED = FALSE;
   DO I = 1 TO NUMBER_ORDERS;
     /* LOOK THROUGH ALL ORDERS */
     IF
      MATCH(O=>ORDER(O=>ORDER.NUMBER=I))
     THEN DO;
      IF
       INDEX(S=>SCHEDULE.ORDER_LIST,O=>ORDER.ID)=0 &
       O=>ORDER.CARBON_LEVEL >=
```

```
        S=>SCHEDULE.ID(S=>SCHEDULE.NEXT_SLOT_AVAILABLE - 1).ORDER

=>ORDER.CARBON_LEVEL                      &
    O=>ORDER.WIDTH       <=
        S=>SCHEDULE.ID(S=>SCHEDULE.NEXT_SLOT_AVAILABLE - 1).ORDER

=>ORDER.WIDTH                             &
    S=>SCHEDULE.ID(S=>SCHEDULE.NEXT_SLOT_AVAILABLE - 1).ORDER

=>ORDER.WIDTH - O=>ORDER.WIDTH
        <= WIDTH_CHANGE_MAX
    THEN DO;
    SCHEDULE_CREATED = TRUE;
    ALLOCATE SCHEDULE SET(S1);
    S1=>SCHEDULE = S=>SCHEDULE;
    S1=>SCHEDULE.ERROR_MESSAGE = '';
    SCHEDULE_COUNTER = SCHEDULE_COUNTER + 1;

IF MOD(SCHEDULE_COUNTER,100)=0 THEN DO;
CALL ASFCLR(2);
        CALL ASCPUT(998,41,
              'CONSIDERING HYPOTHETICAL SCHEDULE NUMBER:');
        CHAR9=SCHEDULE_COUNTER;
        CALL ASCPUT(999,9,CHAR9);
        CALL FSFRCE;
        END;

S1=>SCHEDULE.NUMBER = SCHEDULE_COUNTER;
    IF VERBOSE_PRINT='Y' THEN DO;
      IF HARDCOPY='Y' THEN PUT FILE(TOFILE)
          EDIT('GENERATING SCHEDULE: ',S1=>SCHEDULE.NUMBER,
          ' FROM ',S=>SCHEDULE.NUMBER)
          (SKIP,A,F(6),A,F(6));
      ELSE PUT FILE(TERM)
          EDIT('GENERATING SCHEDULE: ',S1=>SCHEDULE.NUMBER,
          ' FROM ',S=>SCHEDULE.NUMBER)
          (SKIP,A,F(6),A,F(6));
PUT FILE(TOFILE) EDIT(S=>SCHEDULE.ORDER_LIST) (SKIP,A);
      END;   /* END VERBOSE PRINT */
        S1=>SCHEDULE.ORDER_LIST =
          S1=>SCHEDULE.ORDER_LIST || O=>ORDER.ID||'-';
        S1=>SCHEDULE.ID(S=>SCHEDULE.NEXT_SLOT_AVAILABLE).ORDER = O;

S1=>SCHEDULE.LAST_SLOT_FILLED =
          S1=>SCHEDULE.NEXT_SLOT_AVAILABLE;
      H = S1=>SCHEDULE.NEXT_SLOT_AVAILABLE;
      DO J = H TO 40;
        IF S1=>SCHEDULE.ID(J).ORDER =>ORDER.PRODUCT = ''
        THEN LEAVE;
        S1=>SCHEDULE.NEXT_SLOT_AVAILABLE =
          S1=>SCHEDULE.NEXT_SLOT_AVAILABLE + 1;
      END; /* END THE NEXT_SLOT_AVAIL TO 40 BLOCK */
```

```
    IF S1=>SCHEDULE.NEXT_SLOT_AVAILABLE > 40
       THEN S1=>SCHEDULE.NEXT_SLOT_AVAILABLE = 0;
 /* IF S1=>SCHEDULE.NEXT_SLOT_AVAILABLE >= 27 THEN */

REFRESH S1=>SCHEDULE;
IF VERBOSE_PRINT='Y' THEN DO;
     call wkly(s1);
END;    /* END VERBOSE PRINT */
  END; /* END THE IF MATCH O=>ORDER.NUMBER */
 END;
 END; /* THE DO TO NUMBER_ORDERS BLOCK */
IF VERBOSE_PRINT='Y' THEN DO;
 IF HARDCOPY='Y' THEN PUT FILE(TOFILE)
    EDIT('FREEING PARENT SCHEDULE: ',S=>SCHEDULE.NUMBER, ' (TOTAL FREED: ',SCHEDULES_FREED,')')
    (SKIP,A,F(6),A,F(6),A);
 ELSE PUT FILE(TERM)
    EDIT('FREEING PARENT SCHEDULE: ',S=>SCHEDULE.NUMBER, ' (TOTAL FREED: ',SCHEDULES_FREED,')')
    (SKIP,A,F(6),A,F(6),A);
END;    /* END VERBOSE PRINT */
 SCHEDULES_FREED = SCHEDULES_FREED + 1;
 SCHEDULE_CREATED = FALSE;
 FREE S=>SCHEDULE; /* IMPORTANT! ALWAYS FREE A PARENT SCHEDULE

WHETHER CHILDREN CAN BE GENERATED OR NOT */

END;            /* END RULE BLOCK            */

FREE_HOPELESS_SCHEDULES:
/* ************************************************************ */
/* **************GARBAGE COLLECTION********************** */
/* ON A VERY HIGH PRIORITY BASIS, FREE SCHEDULES FOR WHICH IT IS */

/* NOT POSSIBLE TO FIND AN ORDER THAT IS NOT YET ASSIGNED TO IT  */

/* THAT MEETS THE CARBON LEVEL INCREASING, ORDER WIDTH
DECREASING, */
/* AND WIDTH DELTA PROSCRIPTIONS                    */
/* ************************************************************ */
WHEN(PRIOR950,
     S=>SCHEDULE(S=>SCHEDULE.NEXT_SLOT_AVAILABLE =

S=>SCHEDULE.LAST_SLOT_FILLED + 1,
         S=>SCHEDULE.ORDER_LIST^='',
         S=>SCHEDULE.ID(S=>SCHEDULE.NEXT_SLOT_AVAILABLE).ORDER

=>ORDER.PRODUCT ^= 'XXX'
         )                              &
  ^T=>ORDER(
```

```
T=>ORDER.PRODUCT ¬= '',
T=>ORDER.PRODUCT ¬= 'XXX',
INDEX(S=>SCHEDULE.ORDER_LIST,T=>ORDER.ID)=0,
T=>ORDER.CARBON_LEVEL >=
   S=>SCHEDULE.ID(S=>SCHEDULE.LAST_SLOT_FILLED).ORDER

=>ORDER.CARBON_LEVEL,
T=>ORDER.WIDTH      <=
   S=>SCHEDULE.ID(S=>SCHEDULE.LAST_SLOT_FILLED).ORDER

=>ORDER.WIDTH,
S=>SCHEDULE.ID(S=>SCHEDULE.LAST_SLOT_FILLED).ORDER

=>ORDER.WIDTH - T=>ORDER.WIDTH
   <= WIDTH_CHANGE_MAX
   )
   )
  BEGIN;

IF VERBOSE_PRINT='Y' THEN DO;
   IF HARDCOPY='Y' THEN PUT FILE(TOFILE)
      EDIT('FREEING HOPELESS SCHEDULE: ',S=>SCHEDULE.NUMBER,

' (TOTAL FREED: ',SCHEDULES_FREED,')')
      (SKIP,A,F(6),A,F(6),A);
   ELSE PUT FILE(TERM)
      EDIT('FREEING HOPELESS SCHEDULE: ',S=>SCHEDULE.NUMBER,

' (TOTAL FREED: ',SCHEDULES_FREED,')')
      (SKIP,A,F(6),A,F(6),A);
  PUT FILE(TOFILE) EDIT(S=>SCHEDULE.ORDER_LIST) (SKIP,A);
   SCHEDULES_FREED = SCHEDULES_FREED + 1;
   FREE S=>SCHEDULE;
  END;   /* END VERBOSE PRINT */

END;              /* END RULE BLOCK       */

ASSIGN_THINNEST_ORDER:
/* ************************************************** */
/* ASSIGN NARROWEST ORDER TO END OF LONGEST TRANSITION     */

/* ************************************************** */
WHEN(PRIOR120,
   Y1=>ORDER(FRI_DAY='X',
        Y1=>ORDER.ASSIGNED = FALSE,
        Y1=>ORDER.PRODUCT ¬= '',
        Y1=>ORDER.PRODUCT ¬= 'XXX')      &
   ¬Y3=>ORDER(Y3=>ORDER.ASSIGNED = FALSE,
        Y3=>ORDER.PRODUCT ¬= '',
        Y3=>ORDER.PRODUCT ¬= 'XXX',
```

```
        Y1=>ORDER.WIDTH >
        Y3=>ORDER.WIDTH
        )                    &
  Y4=>TRANSITION &
 ~Y5=>TRANSITION( (Y5=>TRANSITION.END-Y5=>TRANSITION.START) >

(Y4=>TRANSITION.END-Y4=>TRANSITION.START) ) &
  Y2=>SCHEDULE(
    Y2=>SCHEDULE.STATUS = 'GOOD',
    Y2=>SCHEDULE.ID(Y4=>TRANSITION.END).ORDER=>
    ORDER.PRODUCT='',
    INDEX(Y2=>SCHEDULE.ORDER_LIST,Y1=>ORDER.ID)=0)
  )
BEGIN;
      Y2=>SCHEDULE.ORDER_LIST =
        Y2=>SCHEDULE.ORDER_LIST || Y1=>ORDER.ID||'-';
      Y2=>SCHEDULE.ID(Y4=>TRANSITION.END).ORDER=Y1;
      Y2=>SCHEDULE.LAST_SLOT_FILLED=Y4=>TRANSITION.END;

Y2=>SCHEDULE.NEXT_SLOT_AVAILABLE=3;
      Y1=>ORDER.ASSIGNED   = TRUE;
      CALL WKLY(Y2);
END;                /* END RULE BLOCK         */

ASSIGN_HIGHEST_CARBON:
/* ************************************************************ */
/* ASSIGN HIGHEST CARBON ORDER TO END OF A TRANSITION       */

/* THAT HAS AN EMPTY SLOT                                */
/* ************************************************************ */
WHEN(PRIOR120,
    Y1=>ORDER(Y1=>ORDER.ASSIGNED = FALSE,
          Y1=>ORDER.PRODUCT ~= '',
          Y1=>ORDER.PRODUCT ~= 'XXX'
          )                 &
   ~Y3=>ORDER(
          Y3=>ORDER.PRODUCT ~= '',
          Y3=>ORDER.PRODUCT ~= 'XXX',
          Y3=>ORDER.CARBON_LEVEL >
          Y1=>ORDER.CARBON_LEVEL
          )                 &
    Y2=>SCHEDULE(

Y2=>SCHEDULE.STATUS = 'GOOD',
    INDEX(Y2=>SCHEDULE.ORDER_LIST,Y1=>ORDER.ID)=0
          )                 &
  Y4=>TRANSITION(
           Y2=>SCHEDULE.ID(Y4=>TRANSITION.END).ORDER=>
                  ORDER.PRODUCT=''
          )                 &
 ~Y5=>TRANSITION( (Y5=>TRANSITION.END-Y5=>TRANSITION.START) >
```

```
            (Y4=>TRANSITION.END-Y4=>TRANSITION.START),
         Y2=>SCHEDULE.ID(Y5=>TRANSITION.END).ORDER=>
                    ORDER.PRODUCT="
        )
   )
   BEGIN;
        Y2=>SCHEDULE.ORDER_LIST =
           Y2=>SCHEDULE.ORDER_LIST || Y1=>ORDER.ID||'-';
        Y2=>SCHEDULE.ID(Y4=>TRANSITION.END).ORDER=Y1;
        Y2=>SCHEDULE.LAST_SLOT_FILLED=Y4=>TRANSITION.END;

Y2=>SCHEDULE.NEXT_SLOT_AVAILABLE=3;
        Y1=>ORDER.ASSIGNED   = TRUE;
        CALL WKLY(Y2);
   END;              /* END RULE BLOCK            */

ASSIGN_LOW_CARB_1ST_POS:
/* ************************************************************ */
/* ASSIGN LOW CARB ORDERS FIRST                         */
/* IF(THERE IS A LOW CARBON ORDER AND                   */
/*   THAT ORDER HAS NOT YET BEEN ASSIGNED TO A TRANSITION) AND   */

/* THERE DOES NOT EXIST A SECOND ORDER SUCH THAT        */
/*   (THE SECOND ORDER IS LOW_CARBON AND                */
/*   IT HAS NOT YET BEEN ASSIGNED TO A TRANSITION AND   */
/*   THE SECOND ORDER IS LARGER THAT THAN THE FIRST ORDER) AND  */

/* THERE EXISTS A "GOOD" STATUS SCHEDULE AND            */
/*   THE FIRST POSTION OF THE TRANSITION IS EMPTY FOR THE SCHEDULE */

/*   AND THE FIRST ORDER IS NOT YET ASSIGNED TO THIS SCHEDULE    */

/* ************************************************************ */
WHEN(PRIOR120,
   Y1=>ORDER(Y1=>ORDER.LOW_CARBON = TRUE,
         Y1=>ORDER.ASSIGNED   = FALSE)   &
   ~Y3=>ORDER(Y3=>ORDER.LOW_CARBON = TRUE,
         Y3=>ORDER.ASSIGNED   = FALSE,
         Y3=>ORDER.WIDTH > Y1=>ORDER.WIDTH) &
   Y4=>TRANSITION &
   Y2=>SCHEDULE(
      Y2=>SCHEDULE.STATUS = 'GOOD',
      Y2=>SCHEDULE.ID(Y4=>TRANSITION.START).ORDER=>
      ORDER.PRODUCT=",
      INDEX(Y2=>SCHEDULE.ORDER_LIST,Y1=>ORDER.ID)=0)
   )
   BEGIN;
        Y2=>SCHEDULE.ORDER_LIST =
           Y2=>SCHEDULE.ORDER_LIST || Y1=>ORDER.ID||'-';
        Y2=>SCHEDULE.ID(Y4=>TRANSITION.START).ORDER=Y1;
        Y2=>SCHEDULE.LAST_SLOT_FILLED=Y4=>TRANSITION.START;

Y2=>SCHEDULE.NEXT_SLOT_AVAILABLE=Y4=>TRANSITION.START +
```

```
1;
      Y1=>ORDER.ASSIGNED   = TRUE;
 DONE:  CALL WKLY(Y2);
 END;            /* END RULE BLOCK          */

ASSIGN_LOW_CARB_2ND_POS:
/* ************************************************** */
/* ASSIGN LOW CARB ORDERS FIRST                        */
/* IF(THERE IS A LOW CARBON ORDER AND                  */
/*    THAT ORDER HAS NOT YET BEEN ASSIGNED TO A TRANSITION) AND */

/* THERE DOES NOT EXIST A SECOND ORDER SUCH THAT       */
/*    (THE SECOND ORDER IS LOW_CARBON AND              */
/*    IT HAS NOT YET BEEN ASSIGNED TO A TRANSITION AND */
/*    THE SECOND ORDER IS LARGER THAT THAN THE FIRST ORDER) AND */
/* THERE EXISTS A "GOOD" STATUS SCHEDULE AND           */
/*    THE 2ND POSITION ON THE SCHEDULE IS EMPTY AFTER A DOWNTOWN
*/
/*    THE FIRST ORDER IS NOT YET ASSIGNED TO THIS SCHEDULE       */

/* ************************************************** */
WHEN(PRIOR120,
    Y1=>ORDER(Y1=>ORDER.LOW_CARBON = TRUE,
          Y1=>ORDER.ASSIGNED  = FALSE)    &
   ~Y3=>ORDER(Y3=>ORDER.LOW_CARBON = TRUE,
          Y3=>ORDER.ASSIGNED  = FALSE,
          Y3=>ORDER.WIDTH > Y1=>ORDER.WIDTH) &
    Y4=>TRANSITION &
    Y2=>SCHEDULE(
      Y2=>SCHEDULE.STATUS = 'GOOD',
      Y2=>SCHEDULE.ID(Y4=>TRANSITION.START + 1).ORDER=>
      ORDER.PRODUCT='',
      INDEX(Y2=>SCHEDULE.ORDER_LIST,Y1=>ORDER.ID)=0)
   )
  BEGIN;
      Y2=>SCHEDULE.ORDER_LIST =
         Y2=>SCHEDULE.ORDER_LIST || Y1=>ORDER.ID||'-';
      Y2=>SCHEDULE.ID(Y4=>TRANSITION.START + 1).ORDER=Y1;
      Y2=>SCHEDULE.LAST_SLOT_FILLED=Y4=>TRANSITION.START + 1;

Y2=>SCHEDULE.NEXT_SLOT_AVAILABLE=Y4=>TRANSITION.START +
2;
      Y1=>ORDER.ASSIGNED   = TRUE;
 DONE:  CALL WKLY(Y2);
 END;            /* END RULE BLOCK          */

ASSIGN_LOW_CARB_2ND_WIDTH:
/* ************************************************** */
/* IF A LOW CARBON ORDER IS AT THE START OF A TURN,    */
/* TRY TO ASSIGN ANOTHER OF THE SAME WIDTH IN THE SECOND */
```

```
/* POSITION (MINIMIZE WIDTH CHANGES)                    */
/* ************************************************** */
WHEN(PRIOR150,

Y1=>ORDER(Y1=>ORDER.LOW_CARBON = TRUE,
       Y1=>ORDER.ASSIGNED  = FALSE)    &
   Y3=>ORDER(Y3=>ORDER.LOW_CARBON = TRUE,
       Y3=>ORDER.ASSIGNED  = TRUE,
       Y3=>ORDER.WIDTH = Y1=>ORDER.WIDTH) &
   Y4=>TRANSITION &
   Y2=>SCHEDULE(
     Y2=>SCHEDULE.STATUS = 'GOOD',
     Y2=>SCHEDULE.ORDER_LIST`=",
     Y2=>SCHEDULE.ID(Y4=>TRANSITION.START).ORDER=Y3,
     Y2=>SCHEDULE.ID(Y4=>TRANSITION.START + 1).ORDER=>
     ORDER.PRODUCT=",
     INDEX(Y2=>SCHEDULE.ORDER_LIST,Y1=>ORDER.ID)=0)
   )
  BEGIN;
       Y2=>SCHEDULE.ORDER_LIST =
         Y2=>SCHEDULE.ORDER_LIST || Y1=>ORDER.ID||'-';
       Y2=>SCHEDULE.ID(Y4=>TRANSITION.START + 1).ORDER=Y1;
       Y2=>SCHEDULE.LAST_SLOT_FILLED=Y4=>TRANSITION.START + 1;

Y2=>SCHEDULE.NEXT_SLOT_AVAILABLE=Y4=>TRANSITION.START +
2;
       Y1=>ORDER.ASSIGNED  = TRUE;
  DONE: CALL WKLY(Y2);
  END;              /* END RULE BLOCK          */

ASSIGN_LOW_CARB_SPECIAL:
/* ************************************************** */
/* ASSIGN LOW CARB SPECIAL ORDERS AFTER ANY OTHER LOW CARB
SPECIAL */
/* ************************************************** */
WHEN(PRIOR150,
    Y1=>ORDER(Y1=>ORDER.LOW_CARBON = TRUE,
        Y1=>ORDER.SPECIAL   = TRUE,
        Y1=>ORDER.ASSIGNED  = FALSE)    &
   Y4=>TRANSITION &
   Y2=>SCHEDULE(
     Y2=>SCHEDULE.STATUS = 'GOOD',
     Y2=>SCHEDULE.ID(Y4=>TRANSITION.START).ORDER=>
     ORDER.SPECIAL=TRUE,
     Y2=>SCHEDULE.ID(Y4=>TRANSITION.START + 1).ORDER=>
     ORDER.PRODUCT=",
     INDEX(Y2=>SCHEDULE.ORDER_LIST,Y1=>ORDER.ID)=0)
   )
  BEGIN;
       Y2=>SCHEDULE.ORDER_LIST =
         Y2=>SCHEDULE.ORDER_LIST || Y1=>ORDER.ID||'-';
       Y2=>SCHEDULE.ID(Y4=>TRANSITION.START + 1).ORDER=Y1;
```

```
        Y2=>SCHEDULE.LAST_SLOT_FILLED=Y4=>TRANSITION.START + 1;

Y2=>SCHEDULE.NEXT_SLOT_AVAILABLE=Y4=>TRANSITION.START +
2;
        Y1=>ORDER.ASSIGNED    = TRUE;
  DONE: CALL WKLY(Y2);
  END;                /* END RULE BLOCK            */

ASSIGN_ONE_SEED:
/* ************************************************************ */
/* ASSIGN ONE SEED TO DEMO TO SHORTEN EXECUTION TIME            */

/* ************************************************************ */
WHEN(PRIOR150,
    Y2=>SCHEDULE(
      Y2=>SCHEDULE.NUMBER = 1,FRI_DAY='X')
    )
  BEGIN;
    IF MATCH(O=>ORDER(O=>ORDER.PRODUCT='301',
              O=>ORDER.WIDTH  = 86))
      THEN DO;
        IF Y2=>SCHEDULE.ID(40).ORDER=>ORDER.PRODUCT ='XXX' |
          Y2=>SCHEDULE.ID(40).ORDER=>ORDER.WIDTH ^=0
        THEN LEAVE;
        Y2=>SCHEDULE.ORDER_LIST =
          Y2=>SCHEDULE.ORDER_LIST || O=>ORDER.ID||'-';
        Y2=>SCHEDULE.ID(40).ORDER=O;
        Y2=>SCHEDULE.LAST_SLOT_FILLED=40;
        Y2=>SCHEDULE.NEXT_SLOT_AVAILABLE=1;
        O=>ORDER.ASSIGNED    = TRUE;
        CALL WKLY(Y2);

END;

END;                /* END RULE BLOCK            */

/* ************************************************************ */
/*      SCHEDULE ERROR DETECTION RULES FOLLOW              */
/* ************************************************************ */

WIDTH_DECREASE_2_HEATS_MIN:
/* ************************************************************ */
/* WIDTH CHANGES SHOULD NOT ALTERNATE HEATS               */
/* ************************************************************ */
WHEN(PRIOR200,
    Y1=>SCHEDULE(ALTERNATE_WIDTH_FLAG='Y') &
    Y2=>TRANSITION
   )
  BEGIN;
  FLAG = FALSE;
  /* THE FIRST TWO SLOTS OF A TRANSITION ARE FILLED BUT THEY ARE NOT
```

```
   THE SAME WIDTH */
  IF Y1=>SCHEDULE.ID(Y2=>TRANSITION.START
).ORDER=>ORDER.WIDTH^=0 &
    Y1=>SCHEDULE.ID(Y2=>TRANSITION.START +
1).ORDER=>ORDER.WIDTH^=0 &
    Y1=>SCHEDULE.ID(Y2=>TRANSITION.START   ).ORDER=>ORDER.WIDTH^=

Y1=>SCHEDULE.ID(Y2=>TRANSITION.START + 1).ORDER=>ORDER.WIDTH

THEN DO; FLAG = TRUE;Y1=>SCHEDULE.BAD_SLOT =
Y2=>TRANSITION.START+1;
    GO TO JUMP9; END;

/* THE LAST TWO SLOTS OF A TRANSITION ARE FILLED BUT THEY ARE NOT

THE SAME WIDTH */

IF Y1=>SCHEDULE.ID(Y2=>TRANSITION.END    ).ORDER=>ORDER.WIDTH^=0
&
    Y1=>SCHEDULE.ID(Y2=>TRANSITION.END  - 1).ORDER=>ORDER.WIDTH^=0
&
    Y1=>SCHEDULE.ID(Y2=>TRANSITION.END    ).ORDER=>ORDER.WIDTH^=

Y1=>SCHEDULE.ID(Y2=>TRANSITION.END  - 1).ORDER=>ORDER.WIDTH

THEN DO; FLAG = TRUE;Y1=>SCHEDULE.BAD_SLOT = Y2=>TRANSITION.END;

GO TO JUMP9; END;

/* THERE ARE THREE SLOTS FILLED WITHIN A TRANSITION, BUT THE
SECOND
    SLOT IS NOT EQUAL TO THE 1ST OR THE THIRD */
  /* DO NOT TEST IF TRANSITION IS ONLY 4 SLOTS */
  IF Y2=>TRANSITION.END - Y2=>TRANSITION.START = 3 THEN GO TO JUMP9;

J = Y2=>TRANSITION.START+2;
  K = Y2=>TRANSITION.END -2;
  DO I=J to K;
    IF Y1=>SCHEDULE.ID(I-1).ORDER=>ORDER.WIDTH^=0 &
      Y1=>SCHEDULE.ID(I  ).ORDER=>ORDER.WIDTH^=0 &
      Y1=>SCHEDULE.ID(I+1).ORDER=>ORDER.WIDTH^=0 &
      Y1=>SCHEDULE.ID(I-1).ORDER=>ORDER.WIDTH^=
      Y1=>SCHEDULE.ID(I  ).ORDER=>ORDER.WIDTH   &
      Y1=>SCHEDULE.ID(I  ).ORDER=>ORDER.WIDTH^=
      Y1=>SCHEDULE.ID(I+1).ORDER=>ORDER.WIDTH
    THEN DO; FLAG = TRUE;Y1=>SCHEDULE.BAD_SLOT = I+1;GO TO JUMP9;
END;
    END;

JUMP9:
  IF FLAG=TRUE
    THEN DO;
```

```
    Y1=>SCHEDULE.WIDTH_DELTA_ERRORS =
     Y1=>SCHEDULE.WIDTH_DELTA_ERRORS + 1;
    Y1=>SCHEDULE.ERROR_MESSAGE =
    'ERROR - WIDTH DECREASE ALLOWED EVERY 2 HEATS MINIMIM     ';

IF VERBOSE_PRINT='Y' THEN DO;
   IF HARDCOPY='Y' THEN PUT FILE(TOFILE)
     EDIT('! SCHEDULE NUMBER ',Y1=>SCHEDULE.NUMBER,
     ' SHOWS WIDTH DECREASES TOO OFTEN (2 HEAT MINIMUM) AT SLOT ',

Y1=>SCHEDULE.BAD_SLOT)
     (SKIP(1),A,F(6),A,F(2));
   IF HARDCOPY^='Y' THEN PUT FILE(TERM)
     EDIT('! SCHEDULE NUMBER ',Y1=>SCHEDULE.NUMBER,
     ' SHOWS WIDTH DECREASES TOO OFTEN (2 HEAT MINIMUM) AT SLOT ',

Y1=>SCHEDULE.BAD_SLOT)
     (SKIP(1),A,F(6),A,F(2));
   END; /* VERBOSE PRINT */
  END; /* FLAG = TRUE */
  END; /* END ALTERNATE RULE BLOCK */

FUNDAMENTAL_CHECK:
/* ************************************************************ */
/* EVERY TIME A SCHEDULE IS UPDATED, CHECK IF:                  */
/* CARBON LEVEL IS DECREASING IN A TRANSITION....               */
/* WIDTH IS INCREASING....                          */
/* WIDTH DELTA IS WITHIN LIMITS.....                */
/* ************************************************************ */
WHEN(PRIOR200,
   Y1=>SCHEDULE(*)
   )
 BEGIN;

DO I = 2 TO 40;

IF Y1=>SCHEDULE.ID(I ).ORDER=>ORDER.ID^='00' &
    Y1=>SCHEDULE.ID(I-1).ORDER=>ORDER.ID^='00' &
    Y1=>SCHEDULE.ID(I ).ORDER=>ORDER.CARBON_LEVEL <

Y1=>SCHEDULE.ID(I-1).ORDER=>ORDER.CARBON_LEVEL
    THEN DO;
     IF VERBOSE_PRINT='Y' THEN DO;
      IF HARDCOPY='Y' THEN PUT FILE(TOFILE)
      EDIT(' SCHEDULE NUMBER ',Y1=>SCHEDULE.NUMBER,
      ' SHOWS CARBON LEVEL DECREASING FROM SLOT ',
      I-1,' TO SLOT ',I)
      (SKIP(1),A,F(6),A,F(2),A,F(2));
      ELSE PUT FILE(TERM)
      EDIT(' SCHEDULE NUMBER ',Y1=>SCHEDULE.NUMBER,
```

```
 ' SHOWS CARBON LEVEL DECREASING FROM SLOT ',
 I-1,' TO SLOT ',I)
 (SKIP(1),A,F(6),A,F(2),A,F(2));
 END;   /* END VERBOSE PRINT */
 Y1=>SCHEDULE.CARBON_DECREASING_ERRORS =
   Y1=>SCHEDULE.CARBON_DECREASING_ERRORS + 1;
 Y1=>SCHEDULE.ERROR_MESSAGE =
 'ERROR - CARBON LEVEL IS DECREASING IN ACROSS AN UP TURN   ';

END; /* CARBON LEVEL ERROR DETECTED */

IF Y1=>SCHEDULE.ID(I  ).ORDER=>ORDER.ID^='00' &
   Y1=>SCHEDULE.ID(I-1).ORDER=>ORDER.ID^='00' &
   Y1=>SCHEDULE.ID(I  ).ORDER=>ORDER.WIDTH >
   Y1=>SCHEDULE.ID(I-1).ORDER=>ORDER.WIDTH
   THEN DO;
   Y1=>SCHEDULE.BAD_SLOT = I;
   IF VERBOSE_PRINT='Y' THEN DO;
    IF HARDCOPY='Y' THEN PUT FILE(TOFILE)
    EDIT(' SCHEDULE NUMBER ',Y1=>SCHEDULE.NUMBER,
    ' SHOWS WIDTH INCREASING FROM SLOT ',
    I-1,' TO SLOT ',I)
    (SKIP(1),A,F(6),A,F(2),A,F(2));
    ELSE PUT FILE(TERM)
    EDIT(' SCHEDULE NUMBER ',Y1=>SCHEDULE.NUMBER,
    ' SHOWS WIDTH INCREASING FROM SLOT ',
    I-1,' TO SLOT ',I)
    (SKIP(1),A,F(6),A,F(2),A,F(2));
   END;   /* END VERBOSE PRINT */
   Y1=>SCHEDULE.WIDTH_INCREASING_ERRORS =
   Y1=>SCHEDULE.WIDTH_INCREASING_ERRORS + 1;
  Y1=>SCHEDULE.ERROR_MESSAGE =
 'ERROR - HEAT WIDTH IS INCREASING ACROSS AN UP TURN   ';
  END; /* WIDTH ERROR DETECTED */

IF Y1=>SCHEDULE.ID(I  ).ORDER=>ORDER.ID^='00' &
   Y1=>SCHEDULE.ID(I-1).ORDER=>ORDER.ID^='00' &
   Y1=>SCHEDULE.ID(I-1).ORDER=>ORDER.WIDTH -
   Y1=>SCHEDULE.ID(I  ).ORDER=>ORDER.WIDTH > WIDTH_CHANGE_MAX

THEN DO;
   IF VERBOSE_PRINT='Y' THEN DO;
    IF HARDCOPY='Y' THEN PUT FILE(TOFILE)
    EDIT(' SCHEDULE NUMBER ',Y1=>SCHEDULE.NUMBER,
    ' SHOWS WIDTH DELTA ERROR FROM SLOT ',
    I-1,' TO SLOT ',I)
    (SKIP(1),A,F(6),A,F(2),A,F(2));
    ELSE PUT FILE(TERM)
    EDIT(' SCHEDULE NUMBER ',Y1=>SCHEDULE.NUMBER,
    ' SHOWS WIDTH DELTA ERROR FROM SLOT ',
    I-1,' TO SLOT ',I)
    (SKIP(1),A,F(6),A,F(2),A,F(2));
```

```
        END;   /* END VERBOSE PRINT */
     Y1=>SCHEDULE.WIDTH_DELTA_ERRORS =
        Y1=>SCHEDULE.WIDTH_DELTA_ERRORS + 1;
     Y1=>SCHEDULE.ERROR_MESSAGE =
     'ERROR - HEAT WIDTH IS CHANGING BY MORE THAN MAX ALLOWED    ';

END; /* WIDTH DELTA ERROR DETECTED */
   END; /* LOOP TO NUMBER ORDERS */

END;              /* END RULE BLOCK             */

CARBON_LEVEL_DECREASE:
/* ************************************************************ */
/* CARBON LEVEL IS DECREASING IN A TRANSITION....               */
/* ************************************************************ */
WHEN(PRIOR200,
   Y1=>SCHEDULE(
      Y1=>SCHEDULE.LAST_SLOT_FILLED > 1,
      Y1=>SCHEDULE.ID(Y1=>SCHEDULE.LAST_SLOT_FILLED).ORDER

=>ORDER.CARBON_LEVEL <
      Y1=>SCHEDULE.ID(Y1=>SCHEDULE.LAST_SLOT_FILLED - 1).ORDER

=>ORDER.CARBON_LEVEL)
   )
BEGIN;
IF VERBOSE_PRINT='Y' THEN DO;
   IF HARDCOPY='Y' THEN PUT FILE(TOFILE)
   EDIT(' SCHEDULE NUMBER ',Y1=>SCHEDULE.NUMBER,
   ' SHOWS CARBON LEVEL DECREASING FROM SLOT ',
   Y1=>SCHEDULE.LAST_SLOT_FILLED - 1,' TO SLOT ',
   Y1=>SCHEDULE.LAST_SLOT_FILLED)
   (SKIP(1),A,F(6),A,F(2),A,F(2));
   ELSE PUT FILE(TERM)
   EDIT(' SCHEDULE NUMBER ',Y1=>SCHEDULE.NUMBER,
   ' SHOWS CARBON LEVEL DECREASING FROM SLOT ',
   Y1=>SCHEDULE.LAST_SLOT_FILLED - 1,' TO SLOT ',
   Y1=>SCHEDULE.LAST_SLOT_FILLED)
   (SKIP(1),A,F(6),A,F(2),A,F(2));
END;   /* END VERBOSE PRINT */

Y1=>SCHEDULE.CARBON_DECREASING_ERRORS =
      Y1=>SCHEDULE.CARBON_DECREASING_ERRORS + 1;
   Y1=>SCHEDULE.ERROR_MESSAGE =
   'ERROR - CARBON LEVEL IS DECREASING IN ACROSS AN UP TURN    ';

END;              /* END RULE BLOCK             */
```

ORDER_WIDTH_INCREASE:
/* ************************************************************ */
/* SLAB WIDTH OF ORDERS IS INCREASING IN A TRANSITION.... */
/* ************************************************************ */
WHEN(PRIOR200,
   Y1=>SCHEDULE(
      Y1=>SCHEDULE.LAST_SLOT_FILLED > 1,
      Y1=>SCHEDULE.ID(Y1=>SCHEDULE.LAST_SLOT_FILLED ).ORDER

=>ORDER.WIDTH >
      Y1=>SCHEDULE.ID(Y1=>SCHEDULE.LAST_SLOT_FILLED - 1 ).ORDER

=>ORDER.WIDTH,
      Y1=>SCHEDULE.ID(Y1=>SCHEDULE.LAST_SLOT_FILLED - 1 ).ORDER

=>ORDER.WIDTH ^= 0)
   )
 BEGIN;

IF VERBOSE_PRINT='Y' THEN DO;
   IF HARDCOPY='Y' THEN PUT FILE(TOFILE)
   EDIT(' SCHEDULE NUMBER ',Y1=>SCHEDULE.NUMBER,
   ' SHOWS WIDTH INCREASING FROM SLOT ',
   Y1=>SCHEDULE.LAST_SLOT_FILLED - 1,' TO SLOT ',
   Y1=>SCHEDULE.LAST_SLOT_FILLED)
   (SKIP(1),A,F(6),A,F(2),A,F(2));
   ELSE PUT FILE(TERM)
   EDIT(' SCHEDULE NUMBER ',Y1=>SCHEDULE.NUMBER,
   ' SHOWS WIDTH INCREASING FROM SLOT ',
   Y1=>SCHEDULE.LAST_SLOT_FILLED - 1,' TO SLOT ',
   Y1=>SCHEDULE.LAST_SLOT_FILLED)
   (SKIP(1),A,F(6),A,F(2),A,F(2));
 END;   /* END VERBOSE PRINT */

Y1=>SCHEDULE.WIDTH_INCREASING_ERRORS =
     Y1=>SCHEDULE.WIDTH_INCREASING_ERRORS + 1;
   Y1=>SCHEDULE.ERROR_MESSAGE =
   'ERROR - HEAT WIDTH IS INCREASING ACROSS AN UP TURN     ';

END;            /* END RULE BLOCK          */

'IDTH_DECREASE_TOO_BIG:
' ************************************************************ */
'* SLAB WIDTH OF ORDERS IS DECREASING IN A TRANSITION BY MORE THAN
/
'* THE ALLOWED MAXIMUM                            */
'* ************************************************************ */

```
WHEN(PRIOR200,
   Y1=>SCHEDULE(
      Y1=>SCHEDULE.LAST_SLOT_FILLED > 1,
      Y1=>SCHEDULE.ID(Y1=>SCHEDULE.LAST_SLOT_FILLED - 1).ORDER

=>ORDER.WIDTH -
      Y1=>SCHEDULE.ID(Y1=>SCHEDULE.LAST_SLOT_FILLED).ORDER

=>ORDER.WIDTH > WIDTH_CHANGE_MAX)
   )
  BEGIN;

IF VERBOSE_PRINT='Y' THEN DO;
    IF HARDCOPY='Y' THEN PUT FILE(TOFILE)
    EDIT(' SCHEDULE NUMBER ',Y1=>SCHEDULE.NUMBER,
    ' SHOWS WIDTH DECREASING FROM SLOT ',
    Y1=>SCHEDULE.LAST_SLOT_FILLED - 1,' TO SLOT ',
    Y1=>SCHEDULE.LAST_SLOT_FILLED,'BY MORE THAN
',WIDTH_CHANGE_MAX)
    (SKIP(1),A,F(6),A,F(2),A,F(2),A,F(2));
    ELSE PUT FILE(TERM)
    EDIT(' SCHEDULE NUMBER ',Y1=>SCHEDULE.NUMBER,
    ' SHOWS WIDTH DECREASING FROM SLOT ',
    Y1=>SCHEDULE.LAST_SLOT_FILLED - 1,' TO SLOT ',
    Y1=>SCHEDULE.LAST_SLOT_FILLED,'BY MORE THAN
',WIDTH_CHANGE_MAX)
    (SKIP(1),A,F(6),A,F(2),A,F(2),A,F(2));
  END;   /* END VERBOSE PRINT */

Y1=>SCHEDULE.WIDTH_DELTA_ERRORS =
    Y1=>SCHEDULE.WIDTH_DELTA_ERRORS + 1;
  Y1=>SCHEDULE.ERROR_MESSAGE =
  'ERROR - CARBON LEVEL IS DECREASING IN ACROSS AN UP TURN   ';

END;           /* END RULE BLOCK            */

CHECK_401_ADDITION:
/* ************************************************************ */
/* IF A 401 ORDER HAS JUST BEEN ADDED,              */
/* THEN CHECK THAT THERE ARE NOT MORE THAN TWO 401 HEATS PER
TURN */
/*   AND                          */
/*   CHECK THAT THERE ARE NOT MORE THAN THREE 401 HEATS PER DAY
*/
/*   AND                          */
/*   CHECK THAT THE FIRST HEAT OF A TURN IS NOT a 401      */
/* ************************************************************ */
WHEN(PRIOR200,
   Y1=>SCHEDULE(
      Y1=>SCHEDULE.ID(Y1=>SCHEDULE.LAST_SLOT_FILLED).ORDER
```

```
    =>ORDER.PRODUCT='401')                &
Y2=>TRANSITION(
    Y2=>TRANSITION.START <= Y1=>SCHEDULE.LAST_SLOT_FILLED,

Y2=>TRANSITION.END   >= Y1=>SCHEDULE.LAST_SLOT_FILLED)

)
BEGIN;

/* FIND THE TURN (4 SLOT PERIOD) THAT THE 401 WAS JUST ADDED */

SELECT;
WHEN(Y1=>SCHEDULE.LAST_SLOT_FILLED > 0 &
   Y1=>SCHEDULE.LAST_SLOT_FILLED < 5)
   DO; TURN_START=1; TURN_END=4; END;
WHEN(Y1=>SCHEDULE.LAST_SLOT_FILLED > 4 &
   Y1=>SCHEDULE.LAST_SLOT_FILLED < 9)
   DO; TURN_START=5; TURN_END=8; END;
WHEN(Y1=>SCHEDULE.LAST_SLOT_FILLED > 8 &
   Y1=>SCHEDULE.LAST_SLOT_FILLED < 13)
   DO; TURN_START=9; TURN_END=12; END;
WHEN(Y1=>SCHEDULE.LAST_SLOT_FILLED > 12 &
    Y1=>SCHEDULE.LAST_SLOT_FILLED < 17)
    DO; TURN_START=13; TURN_END=16; END;
 WHEN(Y1=>SCHEDULE.LAST_SLOT_FILLED > 16 &
    Y1=>SCHEDULE.LAST_SLOT_FILLED < 21)
    DO; TURN_START=17; TURN_END=20; END;
 WHEN(Y1=>SCHEDULE.LAST_SLOT_FILLED > 20 &
    Y1=>SCHEDULE.LAST_SLOT_FILLED < 25)
    DO; TURN_START=21; TURN_END=24; END;
 WHEN(Y1=>SCHEDULE.LAST_SLOT_FILLED > 24 &
    Y1=>SCHEDULE.LAST_SLOT_FILLED < 29)
    DO; TURN_START=25; TURN_END=28; END;
 WHEN(Y1=>SCHEDULE.LAST_SLOT_FILLED > 28 &
    Y1=>SCHEDULE.LAST_SLOT_FILLED < 33)
    DO; TURN_START=29; TURN_END=32; END;
 WHEN(Y1=>SCHEDULE.LAST_SLOT_FILLED > 32 &
    Y1=>SCHEDULE.LAST_SLOT_FILLED < 37)
    DO; TURN_START=33; TURN_END=36; END;
 WHEN(Y1=>SCHEDULE.LAST_SLOT_FILLED > 36 &
    Y1=>SCHEDULE.LAST_SLOT_FILLED <=40)
    DO; TURN_START=37; TURN_END=40; END;
OTHERWISE DISPLAY('PROPER 401 TURN PERIOD NOT DETECTED');

END; /* END SELECT */

/* CHECK FOR NUMBER 401's IN A TURN (ONE 4 SLOT PERIOD) */
I = 0;
DO J = TURN_START TO TURN_END;
```

```
    IF Y1=>SCHEDULE.ID(J).ORDER => ORDER.PRODUCT = '401'
        THEN I = I + 1;
END;  /* END DO LOOP */
/* I NOW CONTAINS THE NUMBER OF 401 HEATS IN THE TURN */

/* DETERMINE THE LIMITS OF THE DAY OF THE LAST SLOT FILLED */

SELECT;
WHEN(Y1=>SCHEDULE.LAST_SLOT_FILLED > 0 &
    Y1=>SCHEDULE.LAST_SLOT_FILLED < 9)
    DO; DAY_START=1; DAY_END=8; END;
WHEN(Y1=>SCHEDULE.LAST_SLOT_FILLED > 8 &
    Y1=>SCHEDULE.LAST_SLOT_FILLED < 17 )

DO; DAY_START=9; DAY_END=16; END;
WHEN(Y1=>SCHEDULE.LAST_SLOT_FILLED > 16 &
    Y1=>SCHEDULE.LAST_SLOT_FILLED < 25 )
    DO; DAY_START=17; DAY_END=24; END;
WHEN(Y1=>SCHEDULE.LAST_SLOT_FILLED > 24 &
    Y1=>SCHEDULE.LAST_SLOT_FILLED < 33 )
    DO; DAY_START=25; DAY_END=32; END;
WHEN(Y1=>SCHEDULE.LAST_SLOT_FILLED > 32 &
    Y1=>SCHEDULE.LAST_SLOT_FILLED <=40 )
    DO; DAY_START=33; DAY_END=40; END;
OTHERWISE DISPLAY('PROGRAM ERROR IN FINDING 401 DAY PERIOD');

END; /* END SELECT */

K = 0;
DO J = DAY_START TO DAY_END;
  IF Y1=>SCHEDULE.ID(J).ORDER => ORDER.PRODUCT = '401'
      THEN K = K + 1;
END;  /* END DO LOOP */
/* K NOW CONTAINS THE NUMBER OF 401 HEATS IN THE DAY */

/* CHECK FOR 401 ORDER AT THE START OF A TURN     */
IF Y1=>SCHEDULE.LAST_SLOT_FILLED = 1 |
  Y1=>SCHEDULE.LAST_SLOT_FILLED = 5 |
  Y1=>SCHEDULE.LAST_SLOT_FILLED = 9 |
  Y1=>SCHEDULE.LAST_SLOT_FILLED =13 |
  Y1=>SCHEDULE.LAST_SLOT_FILLED =17 |
  Y1=>SCHEDULE.LAST_SLOT_FILLED =21 |
  Y1=>SCHEDULE.LAST_SLOT_FILLED =25 |
  Y1=>SCHEDULE.LAST_SLOT_FILLED =29 |
  Y1=>SCHEDULE.LAST_SLOT_FILLED =33 |
  Y1=>SCHEDULE.LAST_SLOT_FILLED =37
      THEN DO;
      Y1=>SCHEDULE.FOUR_O_ONE_ERRORS =
      Y1=>SCHEDULE.FOUR_O_ONE_ERRORS + 1;
  Y1=>SCHEDULE.ERROR_MESSAGE =
'ERROR - A 401 ORDER IS THE FIRST HEAT OF A TURN       ';
      Y1=>SCHEDULE.BAD_SLOT = Y1=>SCHEDULE.LAST_SLOT_FILLED;
```

```
        IF VERBOSE_PRINT='Y' THEN DO;
            IF HARDCOPY='Y' THEN PUT FILE(TOFILE)
            EDIT('! SCHEDULE NUMBER ',Y1=>SCHEDULE.NUMBER,
            ' HAS A 401 AS THE FIRST HEAT OF A TURN - SLOT ',
            Y1=>SCHEDULE.LAST_SLOT_FILLED)
            (SKIP(1),A,F(6),A,F(2));
            IF HARDCOPY`='Y' THEN PUT FILE(TERM)
            EDIT('! SCHEDULE NUMBER ',Y1=>SCHEDULE.NUMBER,
            ' HAS A 401 AS THE FIRST HEAT OF A TURN - SLOT ',
            Y1=>SCHEDULE.LAST_SLOT_FILLED)
            (SKIP(1),A,F(6),A,F(2));
     END;    /* END VERBOSE PRINT */
            END;
    /* MORE THAN TWO 401 HEATS PER TURN         */
    IF I > 2 THEN DO;
            Y1=>SCHEDULE.FOUR_O_ONE_ERRORS =
            Y1=>SCHEDULE.FOUR_O_ONE_ERRORS + 1;
            Y1=>SCHEDULE.BAD_SLOT =
Y1=>SCHEDULE.LAST_SLOT_FILLED;
            Y1=>SCHEDULE.ERROR_MESSAGE =
     'ERROR - THERE ARE MORE THAN TWO 401 HEATS IN A TURN
            END;
    /* MORE THAN THREE 401 HEATS PER DAY        */
    IF K > 3 THEN DO;
            Y1=>SCHEDULE.FOUR_O_ONE_ERRORS =
            Y1=>SCHEDULE.FOUR_O_ONE_ERRORS + 1;
            Y1=>SCHEDULE.BAD_SLOT =
1=>SCHEDULE.LAST_SLOT_FILLED;
            Y1=>SCHEDULE.ERROR_MESSAGE =
      'ERROR - THERE ARE MORE THAN THREE 401 HEATS IN A DAY
            END;

IF VERBOSE_PRINT='Y' THEN DO;
IF I > 2 | K > 3 THEN Y1=>SCHEDULE.BAD_SLOT =
            Y1=>SCHEDULE.LAST_SLOT_FILLED;
IF I > 2 & HARDCOPY='Y' THEN PUT FILE(TOFILE)
    EDIT('! SCHEDULE NUMBER ',Y1=>SCHEDULE.NUMBER,
    ' CONTAINS MORE THAN 2 401 HEATS IN A TURN - SLOT ',
    Y1=>SCHEDULE.LAST_SLOT_FILLED)
    (SKIP(1),A,F(6),A,F(2));

IF I > 2 & HARDCOPY`='Y' THEN PUT FILE(TERM)
    EDIT('! SCHEDULE NUMBER ',Y1=>SCHEDULE.NUMBER,
    ' CONTAINS MORE THAN 2 401 HEATS IN A TURN - SLOT ',
    Y1=>SCHEDULE.LAST_SLOT_FILLED)
    (SKIP(1),A,F(6),A,F(2));
IF K > 3 & HARDCOPY='Y' THEN PUT FILE(TOFILE)
    EDIT('! SCHEDULE NUMBER ',Y1=>SCHEDULE.NUMBER,
    ' CONTAINS MORE THAN 3 401 HEATS IN A DAY - SLOT ',
    Y1=>SCHEDULE.LAST_SLOT_FILLED)
    (SKIP(1),A,F(6),A,F(2));
```

```
    IF K > 3 & HARDCOPY^='Y' THEN PUT FILE(TERM)
      EDIT('! SCHEDULE NUMBER ',Y1=>SCHEDULE.NUMBER,
      ' CONTAINS MORE THAN 3 401 HEATS IN A DAY - SLOT ',
      Y1=>SCHEDULE.LAST__SLOT__FILLED)
      (SKIP(1),A,F(6),A,F(2));
    END;    /* END VERBOSE PRINT */
   END;                /* END RULE BLOCK         */

SPECIAL__AFTER__3RD__HEAT:
 /* ************************************************** */
 /* NO SPECIALS AFTER THE FIRST 3 HEATS OF A TURN....   */
 /* ************************************************** */
 WHEN(PRIOR200,
   Y1=>SCHEDULE(
      Y1=>SCHEDULE.ID(Y1=>SCHEDULE.LAST__SLOT__FILLED).ORDER

=>ORDER.SPECIAL=TRUE)
    )
  BEGIN;
  /* CHECK FOR SPECIAL ORDER AS THE 4TH ORDER OF A TURN */

IF Y1=>SCHEDULE.LAST__SLOT__FILLED = 4 |
     Y1=>SCHEDULE.LAST__SLOT__FILLED = 8 |
     Y1=>SCHEDULE.LAST__SLOT__FILLED =12 |
     Y1=>SCHEDULE.LAST__SLOT__FILLED =16 |
     Y1=>SCHEDULE.LAST__SLOT__FILLED =20 |
     Y1=>SCHEDULE.LAST__SLOT__FILLED =24 |
     Y1=>SCHEDULE.LAST__SLOT__FILLED =28 |
     Y1=>SCHEDULE.LAST__SLOT__FILLED =32 |
     Y1=>SCHEDULE.LAST__SLOT__FILLED =36 |
     Y1=>SCHEDULE.LAST__SLOT__FILLED =40
  THEN DO;
  Y1=>SCHEDULE.SPECIAL__ORDER__ERRORS =
    Y1=>SCHEDULE.SPECIAL__ORDER__ERRORS + 1;
    Y1=>SCHEDULE.ERROR__MESSAGE =
    'ERROR - NO SPECIAL ORDERS AFTER THE THIRD HEAT OF A TURN  ';

Y1=>SCHEDULE.BAD__SLOT = Y1=>SCHEDULE.LAST__SLOT__FILLED;

IF VERBOSE__PRINT='Y' THEN DO;
 IF HARDCOPY='Y' THEN PUT FILE(TOFILE)
   EDIT('SCHEDULE NUMBER ',Y1=>SCHEDULE.NUMBER,
    ' CONTAINS A SPECIAL AFTER THE 3RD HEAT IN A TURN',
    ' SLOT ',Y1=>SCHEDULE.LAST__SLOT__FILLED)
   (SKIP(1),A,F(6),A,SKIP,A,F(2));
 IF HARDCOPY^='Y' THEN PUT FILE(TERM)
   EDIT('SCHEDULE NUMBER ',Y1=>SCHEDULE.NUMBER,
    ' CONTAINS A SPECIAL AFTER THE 3RD HEAT IN A TURN',
```

```
       ' SLOT ',Y1=>SCHEDULE.LAST_SLOT_FILLED)
       (SKIP(1),A,F(6),A,SKIP,A,F(2));
  END;    /* END VERBOSE PRINT */
  END;     /* END THE DO BLOCK */
  END;              /* END RULE BLOCK           */

CHECK_SPECIAL_RUNS_PER_DAY:
/* ************************************************************ */
/* IT IS NOT PERMITTED TO MAKE MORE THAN ONE RUN OF SPECIALS IN   */
/* A CALENDAR DAY (2 TURNS)                          */
/* ************************************************************ */
WHEN(PRIOR200,
  Y1=>SCHEDULE(
     Y1=>SCHEDULE.ID(Y1=>SCHEDULE.LAST_SLOT_FILLED).ORDER

=>ORDER.SPECIAL=TRUE)
   )
  BEGIN;
  /* DETERMINE THE LIMITS OF THE DAY OF THE LAST SLOT FILLED */

SELECT;
  WHEN(Y1=>SCHEDULE.LAST_SLOT_FILLED > 0 &
     Y1=>SCHEDULE.LAST_SLOT_FILLED < 9)
     DO; DAY_START=1; DAY_END=8; END;
  WHEN(Y1=>SCHEDULE.LAST_SLOT_FILLED > 8 &
     Y1=>SCHEDULE.LAST_SLOT_FILLED < 17 )
     DO; DAY_START=9; DAY_END=16; END;
  WHEN(Y1=>SCHEDULE.LAST_SLOT_FILLED > 16 &
     Y1=>SCHEDULE.LAST_SLOT_FILLED < 25 )
     DO; DAY_START=17; DAY_END=24; END;
  WHEN(Y1=>SCHEDULE.LAST_SLOT_FILLED > 24 &
     Y1=>SCHEDULE.LAST_SLOT_FILLED < 33 )
     DO; DAY_START=25; DAY_END=32; END;
  WHEN(Y1=>SCHEDULE.LAST_SLOT_FILLED > 32 &
     Y1=>SCHEDULE.LAST_SLOT_FILLED <=40 )
     DO; DAY_START=33; DAY_END=40; END;
  OTHERWISE DISPLAY('PROGRAM ERROR IN FINDING 401 DAY PERIOD');

END; /* END SELECT */
/*
DISPLAY(Y1=>SCHEDULE.LAST_SLOT_FILLED);
DISPLAY(DAY_START);
DISPLAY(DAY_END);  */

I=0;     /* FLAG THAT A NONSPECIAL BREAK HAS OCCURRED */
  H=0;      /* FLAG THAT A NONSPECIAL FOLLOWS A SPECIAL */
  FLAG = FALSE;  /* FLAG THAT A SPECIAL EXISTS            */
  DO J = DAY_START TO DAY_END;
   IF Y1=>SCHEDULE.ID(J).ORDER => ORDER.SPECIAL = TRUE
     THEN FLAG = TRUE; /* A SPECIAL HAS BEEN FOUND */
```

```
IF Y1=>SCHEDULE.ID(J).ORDER => ORDER.SPECIAL = FALSE &
  FLAG = TRUE THEN H=1; /* A NON SPECIAL FOLLOWS A SPECIAL */

IF Y1=>SCHEDULE.ID(J).ORDER => ORDER.SPECIAL = TRUE
  & FLAG = TRUE /* THERE IS NOW A SPECIAL AND A PREVIOUS SPECIAL */

& H=1     /* THERE HAS BEEN A NON SPECIAL */

THEN DO; I=1; LEAVE; END;
END; /* END DO LOOP */

IF I=1    /* MORE THAN ONE SPECIAL RUN PER DAY */
THEN DO;
Y1=>SCHEDULE.SPECIAL_ORDER_ERRORS =
  Y1=>SCHEDULE.SPECIAL_ORDER_ERRORS + 1;

Y1=>SCHEDULE.BAD_SLOT = Y1=>SCHEDULE.LAST_SLOT_FILLED;

Y1=>SCHEDULE.ERROR_MESSAGE =
  'ERROR - ONLY ONE RUN OF SPECIALS PER DAY ALLOWED           ';

IF VERBOSE_PRINT='Y' THEN DO;
 IF HARDCOPY='Y' THEN PUT FILE(TOFILE)
  EDIT('! SCHEDULE NUMBER ',Y1=>SCHEDULE.NUMBER,
  ' CONTAINS A MORE THAN ONE SPECIAL RUN PER DAY (2 TURNS)',

' SLOT ',Y1=>SCHEDULE.LAST_SLOT_FILLED)
  (SKIP(1),A,F(6),A,SKIP,A,F(2));
 IF HARDCOPY='Y' THEN PUT FILE(TERM)
  EDIT('! SCHEDULE NUMBER ',Y1=>SCHEDULE.NUMBER,
  ' CONTAINS A MORE THAN ONE SPECIAL RUN PER DAY (2 TURNS)',

' SLOT ',Y1=>SCHEDULE.LAST_SLOT_FILLED)
  (SKIP(1),A,F(6),A,SKIP,A,F(2));
 END;   /* END VERBOSE PRINT */
 END;    /* END THE DO BLOCK */

END;           /* END RULE BLOCK         */

SPECIAL_DURING_EVENING:
/* *************************************************************** */
/* SPECIAL OCCURS DURING NIGHT TURN                        */
/* *************************************************************** */
WHEN(PRIOR200,
   Y1=>SCHEDULE(
     Y1=>SCHEDULE.ID(Y1=>SCHEDULE.LAST_SLOT_FILLED).ORDER
     =>ORDER.SPECIAL=TRUE)
 )
BEGIN;

IF (Y1=>SCHEDULE.LAST_SLOT_FILLED > 4 &
    Y1=>SCHEDULE.LAST_SLOT_FILLED < 9) |
```

```
   (Y1=>SCHEDULE.LAST_SLOT_FILLED > 12 &
    Y1=>SCHEDULE.LAST_SLOT_FILLED < 17) |
   (Y1=>SCHEDULE.LAST_SLOT_FILLED > 20 &
    Y1=>SCHEDULE.LAST_SLOT_FILLED < 25) |
   (Y1=>SCHEDULE.LAST_SLOT_FILLED > 28 &
    Y1=>SCHEDULE.LAST_SLOT_FILLED < 33) |
   (Y1=>SCHEDULE.LAST_SLOT_FILLED > 36 &
    Y1=>SCHEDULE.LAST_SLOT_FILLED <=40)
HEN DO;

1=>SCHEDULE.NITE_TURN_SPECIAL_ERRORS =
 1=>SCHEDULE.NITE_TURN_SPECIAL_ERRORS + 1;
 1=>SCHEDULE.ERROR_MESSAGE =
 ARNING - SPECIALS DURING NITE SHIFT (USER PERMITTED)    ';

1=>SCHEDULE.BAD_SLOT = Y1=>SCHEDULE.LAST_SLOT_FILLED;

VERBOSE_PRINT='Y' THEN DO;
  HARDCOPY='Y' THEN PUT FILE(TOFILE)
 EDIT('! SCHEDULE NUMBER ',Y1=>SCHEDULE.NUMBER,
  CONTAINS A SPECIAL DURING THE EVENING TURN',
  SLOT ',Y1=>SCHEDULE.LAST_SLOT_FILLED)
 SKIP(1),A,F(6),A,SKIP,A,F(2));
  HARDCOPY`='Y' THEN PUT FILE(TERM)
 EDIT('! SCHEDULE NUMBER ',Y1=>SCHEDULE.NUMBER,
  CONTAINS A SPECIAL DURING THE EVENING TURN',
  SLOT ',Y1=>SCHEDULE.LAST_SLOT_FILLED)
 SKIP(1),A,F(6),A,SKIP,A,F(2));
 D;       /* END VERBOSE PRINT */
 ND;      /* END DO BLOCK          */
 D;       /* END RULE BLOCK        */

IECK_SOLITARY_SPECIAL:
************************************************************/
A RUN OF SPECIALS MUST HAVE AT LEAST 2 HEATS....        */
************************************************************/
HEN(PRIOR200,
Y1=>SCHEDULE(
   Y1=>SCHEDULE.ID(Y1=>SCHEDULE.LAST_SLOT_FILLED).ORDER

=>ORDER.SPECIAL=FALSE,
   Y1=>SCHEDULE.LAST_SLOT_FILLED > 2,
   Y1=>SCHEDULE.ID(Y1=>SCHEDULE.LAST_SLOT_FILLED - 1).ORDER

=>ORDER.SPECIAL=TRUE,
   Y1=>SCHEDULE.ID(Y1=>SCHEDULE.LAST_SLOT_FILLED - 2).ORDER

=>ORDER.SPECIAL=FALSE,
   Y1=>SCHEDULE.ID(Y1=>SCHEDULE.LAST_SLOT_FILLED - 2).ORDER

=>ORDER.PRODUCT`='XXX')

EGIN;
```

```
Y1=>SCHEDULE.SPECIAL_ORDER_ERRORS =
 Y1=>SCHEDULE.SPECIAL_ORDER_ERRORS + 1;
Y1=>SCHEDULE.ERROR_MESSAGE =
'ERROR - A RUN OF SPECIALS MUST BE AT LEAST TWO HEATS       ';

Y1=>SCHEDULE.BAD_SLOT = Y1=>SCHEDULE.LAST_SLOT_FILLED;

IF VERBOSE_PRINT='Y' THEN DO;
IF HARDCOPY='Y' THEN PUT FILE(TOFILE)
  EDIT('! SCHEDULE NUMBER ',Y1=>SCHEDULE.NUMBER,
  ' CONTAINS A RUN OF ONLY ONE SPECIAL IN A TURN',
  'SLOT ',Y1=>SCHEDULE.LAST_SLOT_FILLED)
  (SKIP(1),A,F(6),A,SKIP(1),X(2),A,F(2));
IF HARDCOPY^='Y' THEN PUT FILE(TERM)
  EDIT('! SCHEDULE NUMBER ',Y1=>SCHEDULE.NUMBER,
  ' CONTAINS A RUN OF ONLY ONE SPECIAL IN A TURN',
  'SLOT ',Y1=>SCHEDULE.LAST_SLOT_FILLED)
    (SKIP(1),A,F(6),A,SKIP(1),X(2),A,F(2));
  END;    /* END VERBOSE PRINT */
  END;              /* END RULE BLOCK              */

/* MORE_THAN_3_SPECIAL_RUN:  */
/* ............................................................ */
/* ............................................................ */
/* A RUN OF SPECIALS MUST NOT EXCEED 3 HEATS....                */
/* ............................................................ */
/* ............................................................ */
WHEN(PRIOR200,
   Y1=>SCHEDULE(
     Y1=>SCHEDULE.ID(Y1=>SCHEDULE.LAST_SLOT_FILLED).ORDER

=>ORDER.SPECIAL=TRUE,
     Y1=>SCHEDULE.LAST_SLOT_FILLED > 3,
     Y1=>SCHEDULE.ID(Y1=>SCHEDULE.LAST_SLOT_FILLED - 1).ORDER

=>ORDER.SPECIAL=TRUE,
     Y1=>SCHEDULE.ID(Y1=>SCHEDULE.LAST_SLOT_FILLED - 2).ORDER

=>ORDER.SPECIAL=TRUE,
     Y1=>SCHEDULE.ID(Y1=>SCHEDULE.LAST_SLOT_FILLED - 3).ORDER

=>ORDER.SPECIAL=TRUE)
   )
   BEGIN;

Y1=>SCHEDULE.SPECIAL_ORDER_ERRORS =
    Y1=>SCHEDULE.SPECIAL_ORDER_ERRORS + 1;
  Y1=>SCHEDULE.ERROR_MESSAGE =
  'ERROR - A RUN OF SPECIALS MUST NOT EXCEED THREE HEATS      ';
```

```
1=>SCHEDULE.BAD_SLOT = Y1=>SCHEDULE.LAST_SLOT_FILLED;

VERBOSE_PRINT='Y' THEN DO;
IF HARDCOPY='Y' THEN PUT FILE(TOFILE)
  EDIT('! SCHEDULE NUMBER ',Y1=>SCHEDULE.NUMBER,
  ' CONTAINS A RUN OF MORE THAN 3 SPECIALS IN A TURN',
  ' SLOT POSITION ',Y1=>SCHEDULE.LAST_SLOT_FILLED)
  (SKIP(1),A,F(6),A,SKIP(1),X(2),A,F(2));
IF HARDCOPY^='Y' THEN PUT FILE(TERM)
  EDIT('! SCHEDULE NUMBER ',Y1=>SCHEDULE.NUMBER,
  ' CONTAINS A RUN OF MORE THAN 3 SPECIALS IN A TURN',
  ' SLOT POSITION ',Y1=>SCHEDULE.LAST_SLOT_FILLED)
  (SKIP(1),A,F(6),A,SKIP(1),X(2),A,F(2));
:ND;    /* END VERBOSE PRINT */
'1=>SCHEDULE.BAD_SLOT = Y1=>SCHEDULE.LAST_SLOT_FILLED;

:ND;            /* END RULE BLOCK        */

RST_HEAT_NOT_LOW_CARB:
************************************************** */
FIRST HEAT AFTER A DOWN TURN MUST BE LOW CARBON         */

************************************************** */
HEN(PRIOR200,
  Y4=>TRANSITION &
  Y2=>SCHEDULE(
    Y2=>SCHEDULE.ID(Y4=>TRANSITION.START).ORDER=>
    ORDER.PRODUCT^='',
    Y2=>SCHEDULE.ID(Y4=>TRANSITION.START).ORDER=>
    ORDER.LOW_CARBON=FALSE)
)
IEGIN;

Y2=>SCHEDULE.LOW_CARBON_ERRORS =
  Y2=>SCHEDULE.LOW_CARBON_ERRORS + 1;
Y2=>SCHEDULE.ERROR_MESSAGE =
ERROR - FIRST HEAT AFTER A DOWN TURN MUST BE LOW CARBON   ';

F VERBOSE_PRINT='Y' THEN DO;
IF HARDCOPY='Y' THEN PUT FILE(TOFILE)
  EDIT('! SCHEDULE NUMBER ',Y2=>SCHEDULE.NUMBER,
  ' - FIRST HEAT AFTER DOWNTURN IS NOT LOW CARBON',
  ' SLOT ',Y2=>SCHEDULE.LAST_SLOT_FILLED)
  (SKIP(1),A,F(6),A,SKIP,A,F(2));
F HARDCOPY^='Y' THEN PUT FILE(TERM)
  EDIT('! SCHEDULE NUMBER ',Y2=>SCHEDULE.NUMBER,
  ' - FIRST HEAT AFTER DOWNTURN IS NOT LOW CARBON',
  ' SLOT ',Y2=>SCHEDULE.LAST_SLOT_FILLED)
  (SKIP(1),A,F(6),A,SKIP,A,F(2));
:ND;    /* END VERBOSE PRINT */
.ND;            /* END RULE BLOCK        */
```

```
SECOND_HEAT_NOT_LOW_CARB:
/* ************************************************************ */
/* 2ND HEAT AFTER A DOWN TURN MUST BE LOW CARBON              */
/* ************************************************************ */
WHEN(PRIOR200,
   Y4=>TRANSITION &
   Y2=>SCHEDULE(
     Y2=>SCHEDULE.ID(Y4=>TRANSITION.START + 1).ORDER=>
     ORDER.PRODUCT^='',
     Y2=>SCHEDULE.ID(Y4=>TRANSITION.START).ORDER=>
     ORDER.LOW_CARBON=FALSE)
  )
 BEGIN;

Y2=>SCHEDULE.LOW_CARBON_ERRORS =
   Y2=>SCHEDULE.LOW_CARBON_ERRORS + 1;
 Y2=>SCHEDULE.ERROR_MESSAGE =
 'ERROR - SECOND HEAT AFTER A DOWN TURN MUST BE LOW CARBON   ';

IF VERBOSE_PRINT='Y' THEN DO;
  IF HARDCOPY='Y' THEN PUT FILE(TOFILE)
   EDIT('SCHEDULE NUMBER ',Y2=>SCHEDULE.NUMBER,
    ' - SECOND HEAT AFTER DOWNTURN IS NOT LOW CARBON',
    ' SLOT ',Y2=>SCHEDULE.LAST_SLOT_FILLED)
    (SKIP(1),A,F(6),A,SKIP,A,F(2));
  IF HARDCOPY^='Y' THEN PUT FILE(TERM)
   EDIT('SCHEDULE NUMBER ',Y2=>SCHEDULE.NUMBER,
    ' - SECOND HEAT AFTER DOWNTURN IS NOT LOW CARBON',
    ' SLOT ',Y2=>SCHEDULE.LAST_SLOT_FILLED)
    (SKIP(1),A,F(6),A,SKIP,A,F(2));
 END;   /* END VERBOSE PRINT */
 END;            /* END RULE BLOCK           */

/* ************************************************************ */
/* NOGOOD SCHEDULE RULES FOLLOW                               */
/* ************************************************************ */

CHECK_DUPLICATE_SCHEDULES:
/* ************************************************************ */
/* FREE DUPLICATE SCHEDULES BECAUSE THERE MAY EXIST ORDERS FOR
*/
/* QUANTITIES OF MORE THAN 1. BUT SINCE EACH ORDER HAS A UNIQUE */

/* NUMBER, THERE MAY BE SCHEDULES WITH ESSENTIALLY DUPLICATE
ORDERS */
/* ************************************************************ */
WHEN(PRIOR900,
    Y1=>SCHEDULE       &
    Y2=>SCHEDULE(
```

```
         Y2=>SCHEDULE.NUMBER > Y1=>SCHEDULE.NUMBER,
         Y1=>SCHEDULE.LAST_SLOT_FILLED =
         Y2=>SCHEDULE.LAST_SLOT_FILLED)
)
EGIN;
FLAG = TRUE; /* EVERY ENTRY IS A DUPLICATE */
DO I=1 TO Y1=>SCHEDULE.LAST_SLOT_FILLED;
  IF Y1=>SCHEDULE.ID(I).ORDER => ORDER.PRODUCT ^=
    Y2=>SCHEDULE.ID(I).ORDER => ORDER.PRODUCT   |
    Y1=>SCHEDULE.ID(I).ORDER => ORDER.WIDTH   ^=
    Y2=>SCHEDULE.ID(I).ORDER => ORDER.WIDTH
    THEN FLAG = FALSE; /* TWO ENTRIES DON'T MATCH */
END;
IF FLAG = TRUE
  THEN DO;  /* DO THE FOLLOWING IF EVERY ENTRY IS A DUPLICATE */
  FREE Y2=>SCHEDULE;
F VERBOSE_PRINT='Y' THEN DO;
  IF HARDCOPY='Y' THEN PUT FILE(TOFILE)
    EDIT('SCHEDULE ',Y2=>SCHEDULE.NUMBER,
     ' IS BEING FREED BECAUSE IT IS A DUPLICATE OF ',
     Y1=>SCHEDULE.NUMBER)
    (SKIP,A,F(6),A,F(6));
  ELSE PUT FILE(TERM)
    EDIT('SCHEDULE ',Y2=>SCHEDULE.NUMBER,
     ' IS BEING FREED BECAUSE IT IS A DUPLICATE OF ',
     Y1=>SCHEDULE.NUMBER)
    (SKIP,A,F(6),A,F(6));
:ND;   /* END VERBOSE PRINT */
  END;         /* END FREE SCHEDULE BLOCK */
:ND;          /* END RULE BLOCK */

:EE_CARBON_DECREASING:
*****************************************************/
FREE SCHEDULES THAT HAVE CARBON LEVELS DECREASING       */

*****************************;*************************/
HEN(PRIOR900,
  Y1=>SCHEDULE(Y1=>SCHEDULE.CARBON_DECREASING_ERRORS > 0)

)
IEGIN;

FREE Y1=>SCHEDULE;
SCHEDULES_FREED = SCHEDULES_FREED + 1;
F VERBOSE_PRINT='Y' THEN DO;
IF HARDCOPY='Y' THEN PUT FILE(TOFILE)
    EDIT('SCHEDULE ',Y1=>SCHEDULE.NUMBER,' IS BEING FREED')
    (SKIP,A,F(6),A);
  ELSE PUT FILE(TERM)
    EDIT('SCHEDULE ',Y1=>SCHEDULE.NUMBER,' IS BEING FREED')
    (SKIP,A,F(6),A);
:ND;   /* END VERBOSE PRINT */
:ND;
```

```
FREE_WIDTH_INCREASING:
/* ************************************************************ */
/* FREE SCHEDULES THAT HAVE WIDTH INCREASING ORDERS             */
/* ************************************************************ */
WHEN(PRIOR900,
   Y1=>SCHEDULE(Y1=>SCHEDULE.WIDTH_INCREASING_ERRORS > 0)

)
 BEGIN;

FREE Y1=>SCHEDULE;
  SCHEDULES_FREED = SCHEDULES_FREED + 1;
 IF VERBOSE_PRINT='Y' THEN DO;
  IF HARDCOPY='Y' THEN PUT FILE(TOFILE)
     EDIT('SCHEDULE ',Y1=>SCHEDULE.NUMBER,' IS BEING FREED')
     (SKIP,A,F(6),A);
   ELSE PUT FILE(TERM)
     EDIT('SCHEDULE ',Y1=>SCHEDULE.NUMBER,' IS BEING FREED')
     (SKIP,A,F(6),A);
 END;    /* END VERBOSE PRINT */
 END;

FREE_WIDTH_DELTA:
/* ************************************************************ */
/* FREE SCHEDULES THAT HAVE WIDTH DELTA ERRORS                  */
/* ************************************************************ */
WHEN(PRIOR900,
   Y1=>SCHEDULE(Y1=>SCHEDULE.WIDTH_DELTA_ERRORS > 0)

)
 BEGIN;

FREE Y1=>SCHEDULE;
  SCHEDULES_FREED = SCHEDULES_FREED + 1;
 IF VERBOSE_PRINT='Y' THEN DO;
  IF HARDCOPY='Y' THEN PUT FILE(TOFILE)
     EDIT('SCHEDULE ',Y1=>SCHEDULE.NUMBER,' IS BEING FREED')
     (SKIP,A,F(6),A);
   ELSE PUT FILE(TERM)
     EDIT('SCHEDULE ',Y1=>SCHEDULE.NUMBER,' IS BEING FREED')
     (SKIP,A,F(6),A);
 END;    /* END VERBOSE PRINT */
 END;

FREE_SPECIAL_ORDERS:
/* ************************************************************ */
/* FREE SCHEDULES THAT HAVE SPECIAL ORDERS ERRORS               */
/* ************************************************************ */
WHEN(PRIOR900,
   Y1=>SCHEDULE(Y1=>SCHEDULE.SPECIAL_ORDER_ERRORS > 0)
```

)
EGIN;

FREE Y1=>SCHEDULE;
SCHEDULES_FREED = SCHEDULES_FREED + 1;
` VERBOSE_PRINT='Y' THEN DO;
IF HARDCOPY='Y' THEN PUT FILE(TOFILE)
   EDIT('SCHEDULE ',Y1=>SCHEDULE.NUMBER,' IS BEING FREED')
   (SKIP,A,F(6),A);
 ELSE PUT FILE(TERM)
   EDIT('SCHEDULE ',Y1=>SCHEDULE.NUMBER,' IS BEING FREED')
   (SKIP,A,F(6),A);
ND;   /* END VERBOSE PRINT */
ND;

UR_O_ONE_ORDERS:
/* ************************************************************ */
/* FREE SCHEDULES THAT HAVE 401 ERRORS                          */
/* ************************************************************ */
HEN(PRIOR900,
 Y1=>SCHEDULE(Y1=>SCHEDULE.FOUR_O_ONE_ERRORS > 0)

)
EGIN;

FREE Y1=>SCHEDULE;
SCHEDULES_FREED = SCHEDULES_FREED + 1;
F VERBOSE_PRINT='Y' THEN DO;
IF HARDCOPY='Y' THEN PUT FILE(TOFILE)
   EDIT('SCHEDULE ',Y1=>SCHEDULE.NUMBER,' IS BEING FREED')
   (SKIP,A,F(6),A);
 ELSE PUT FILE(TERM)
   EDIT('SCHEDULE ',Y1=>SCHEDULE.NUMBER,' IS BEING FREED')
   (SKIP,A,F(6),A);
ND;   /* END VERBOSE PRINT */
ND;

W_CARBON_ORDERS:
/* ************************************************************ */
/* FREE SCHEDULES THAT HAVE LOW CARBON ERRORS                   */
/* ************************************************************ */
HEN(PRIOR900,
 Y1=>SCHEDULE(Y1=>SCHEDULE.LOW_CARBON_ERRORS > 0)

)
EGIN;

FREE Y1=>SCHEDULE;
SCHEDULES_FREED = SCHEDULES_FREED + 1;
F VERBOSE_PRINT='Y' THEN DO;
IF HARDCOPY='Y' THEN PUT FILE(TOFILE)
   EDIT('SCHEDULE ',Y1=>SCHEDULE.NUMBER,' IS BEING FREED')
   (SKIP,A,F(6),A);

```
    ELSE PUT FILE(TERM)
      EDIT('SCHEDULE ',Y1=>SCHEDULE.NUMBER,' IS BEING FREED')
      (SKIP,A,F(6),A);
  END;   /* END VERBOSE PRINT */
  END;

NIGHT_TURN_SPECIALS:
/* ************************************************************ */
/* FREE SCHEDULES THAT HAVE MORE THAN MAX_NITE_TURN_SPECIALS'
ERRORS */
/* ************************************************************ */
WHEN(PRIOR900,
   Y1=>SCHEDULE(Y1=>SCHEDULE.NITE_TURN_SPECIAL_ERRORS >
   MAX_NITE_TURN_SPECIALS)
   )
  BEGIN;

FREE Y1=>SCHEDULE;
  SCHEDULES_FREED = SCHEDULES_FREED + 1;
  IF VERBOSE_PRINT='Y' THEN DO;
   IF HARDCOPY='Y' THEN PUT FILE(TOFILE)
      EDIT('SCHEDULE ',Y1=>SCHEDULE.NUMBER,' IS BEING FREED')
      (SKIP,A,F(6),A);
    ELSE PUT FILE(TERM)
      EDIT('SCHEDULE ',Y1=>SCHEDULE.NUMBER,' IS BEING FREED')
      (SKIP,A,F(6),A);
  END;   /* END VERBOSE PRINT */
  END;

SHOW_USER_BAD_SCHEDULE1:
/* ************************************************************ */
/* PICK THE FIRST BAD SCHEDULE THAT IS ALMOST COMPLETE AND ALLOW
*/
/* THE USER TO REMOVE AN ORDER                              */
/* ************************************************************ */
WHEN(PRIOR990,
   Y1=>SCHEDULE(
         SHOW_USER_FLAG1= TRUE,
         LENGTH(Y1=>SCHEDULE.ORDER_LIST) >= 45,
         Y1=>FOUR_O_ONE_ERRORS     > 0)
   )
  BEGIN;
CALL ASFCLR(2);
CALL ASCPUT(88,60,
Y1=>SCHEDULE.ERROR_MESSAGE);
CALL ASCPUT(89,43,
'ENTER THE NUMBER OF THE ORDER TO BE REMOVED');
CALL ASCPUT(90,2,'___');
CALL ASFCUR(90,1,2);
  CALL WKLYG(Y1,'W');
CALL ASCGET(90,2,TWOBYTE);
TWOBYTE = TRANSLATE(TWOBYTE,'0','_');
```

```
CHAR2 = TWOBYTE;
LOT_NUMBER = CHAR2;
CALL ASFCLR(2);
IF SLOT_NUMBER = 0 THEN GO TO JUMP3;

I = INDEX(Y1=>SCHEDULE.ORDER_LIST,
     Y1=>SCHEDULE.ID(SLOT_NUMBER).ORDER=>ORDER.ID);
START = SUBSTR(Y1=>SCHEDULE.ORDER_LIST,1,I-1);
REST = '';
IF I+3 < LENGTH(Y1=>SCHEDULE.ORDER_LIST) THEN
REST = SUBSTR(Y1=>SCHEDULE.ORDER_LIST,I+3);
Y1=>SCHEDULE.ORDER_LIST = START ||REST;

/* POINT TO THE DUMMY ORDER AND SET IT TO SELECTED SLOT */

IF MATCH(O=>ORDER(O=>ORDER.PRODUCT=''))
THEN Y1=>SCHEDULE.ID(SLOT_NUMBER).ORDER = O;
CALL ASCPUT(88,31,
  'SELECTED ORDER HAS BEEN REMOVED');
JUMP3:
CALL ASCPUT(89,32,
  'HIT ENTER TO CONTINUE PROCESSING');
CALL WKLYG(Y1,'W');
CALL ASFCLR(2);
CALL ASCPUT(89,32,
  '********* WORKING ************');
CALL WKLYG(Y1,'Q');
SHOW_USER_FLAG1= FALSE;  /* PREVENT ANY FUTURE RULE FIRINGS */

END;

SHOW_USER_BAD_SCHEDULE2:
/* ***********************************************************/
/* PICK THE FIRST BAD SCHEDULE THAT IS ALMOST COMPLETE AND ALLOW
   THE USER TO REMOVE AN ORDER                             */
/* ***********************************************************/
WHEN(PRIOR990,
Y1=>SCHEDULE(
     SHOW_USER_FLAG2= TRUE,
     LENGTH(Y1=>SCHEDULE.ORDER_LIST) >= 30,
     Y1=>SCHEDULE.SPECIAL_ORDER_ERRORS   > 0)
)
BEGIN;
CALL ASFCLR(2);
CALL ASCPUT(88,60,
  Y1=>SCHEDULE.ERROR_MESSAGE);
CALL ASCPUT(89,43,
  'ENTER THE NUMBER OF THE ORDER TO BE REMOVED');
CALL ASCPUT(90,2,'___');
CALL ASFCUR(90,1,2);
CALL WKLYG(Y1,'W');
```

```
CALL ASCGET(90,2,TWOBYTE);
TWOBYTE = TRANSLATE(TWOBYTE,'0','_');
CHAR2 = TWOBYTE;
SLOT_NUMBER = CHAR2;
CALL ASFCLR(2);
IF SLOT_NUMBER = 0 THEN GO TO JUMP4;

I = INDEX(Y1=>SCHEDULE.ORDER_LIST,
        Y1=>SCHEDULE.ID(SLOT_NUMBER).ORDER=>ORDER.ID);
START = SUBSTR(Y1=>SCHEDULE.ORDER_LIST,1,I-1);
REST = '';
IF I+3 < LENGTH(Y1=>SCHEDULE.ORDER_LIST) THEN
  REST = SUBSTR(Y1=>SCHEDULE.ORDER_LIST,I+3);
Y1=>SCHEDULE.ORDER_LIST = START ||REST;

/* POINT TO THE DUMMY ORDER AND SET IT TO SELECTED SLOT */

IF MATCH(O=>ORDER(O=>ORDER.PRODUCT=''))
THEN Y1=>SCHEDULE.ID(SLOT_NUMBER).ORDER = O;

CALL ASCPUT(88,31,
'SELECTED ORDER HAS BEEN REMOVED');
JUMP4:
CALL ASCPUT(89,32,
'HIT ENTER TO CONTINUE PROCESSING');
CALL WKLYG(Y1,'W');
CALL ASFCLR(2);
CALL ASCPUT(89,32,
'*********** WORKING ************');
CALL WKLYG(Y1,'Q');
  SHOW_USER_FLAG2= FALSE;  /* PREVENT ANY FUTURE RULE FIRINGS */

END;

SHOW_JUST_ABOUT_COMPLETE:
/* ************************************************************ */
/* DISPLAY SCHEDULES THAT ARE NOT COMPLETE, BUT HAVE ONLY 3 SLOTS
*/
/* UNFILLED                              */
/* ************************************************************ */
WHEN(PRIOR990,
   Y1=>SCHEDULE(
         DISPLAY_ALMOST_COMPLETE='Y',
         LENGTH(Y1=>SCHEDULE.ORDER_LIST) >= 111)
   )
  BEGIN;
CALL ASFCLR(2);
CALL ASCPUT(88,60,
Y1=>SCHEDULE.ERROR_MESSAGE);
CHAR9 = Y1=>SCHEDULE.NUMBER;
CHAR65 = 'ALMOST COMPLETE SCHEDULE      '||
```

```
HAR9;
ALL ASCPUT(89,43,CHAR65);
ALL WKLYG(Y1,'W');
END;

OLUTION_FOUND:
/* ************************************************************ */
/* FOUND A SOLUTION (NOT ALL SOLUTIONS!!!!!)                    */
/* ************************************************************ */
WHEN(PRIOR090,
  Y1=>SCHEDULE(
        LENGTH(Y1=>SCHEDULE.ORDER_LIST) >= 96)
  )
 BEGIN;
TIME_END = GMT;          /* MICROSECONDS */
TIME_ELAPSED = TIME_END - TIME_START;
TIME_CHAR   = CHARTIM(TIME_ELAPSED); /* HHMMSSsss AS CHAR */

CHAR65 = 'APPROXIMATE SOLUTION TIME IS '||
       SUBSTR(TIME_CHAR,3,2)
       ||' MINUTES AND '||
       SUBSTR(TIME_CHAR,5,2)||' SECONDS';
CALL ASFCLR(2);
CALL ASCPUT(88,54,CHAR65);
CHAR9 = Y1=>SCHEDULE.NUMBER;
CHAR65 = 'NUMBER SCHEDULES GENERATED BEFORE SOLUTION WAS '||

CHAR9;

IF Y1=>SCHEDULE.ERROR_MESSAGE^='' THEN
CALL ASCPUT(91,60,
Y1=>SCHEDULE.ERROR_MESSAGE);

CALL ASCPUT(89,56,CHAR65);
  CALL WKLYG(Y1,'W');
  RETURN;          /* END KT PROGRAM BY RETURNING TO $MAIN */
  END;

NO_SOLUTION:
/* ************************************************************ */
/* CANNOT FIND SOLUTION                                         */
/* ************************************************************ */
WHEN(PRIOR090,
   Y2=>GOAL &
  ^Y1=>SCHEDULE
   )
  BEGIN;
  PUT FILE(TERM) EDIT(
   'NO ACCEPTABLE SOLUTION FOUND FOR THESE ORDERS AND CONDITIONS')
```

```
 (SKIP,X(10),A);
 PUT FILE(TERM) EDIT('( ',SCHEDULE_COUNTER,
 ' ALTERNATIVE SCHEDULES WERE TRIED AND REJECTED )')
 (SKIP,X(10),A,F(9),A);
  RETURN;          /* END KT PROGRAM BY RETURNING TO $MAIN */
  END;

%INCLUDE NSJSPROC;
END SCHED;
```

RUNLIST

```
   top nsjs;

priority(PRIOR990) = 990;
      priority(PRIOR950) = 950;
      priority(PRIOR900) = 900;
      priority(PRIOR500) = 500;
      priority(PRIOR200) = 200;
      priority(PRIOR195) = 195;
      priority(PRIOR150) = 150;
      priority(PRIOR120) = 120;
      priority(PRIOR110) = 110;
      priority(PRIOR100) = 100;
      priority(PRIOR099) =  99;
      priority(PRIOR098) =  98;
      priority(PRIOR097) =  97;
      priority(PRIOR096) =  96;
      priority(PRIOR095) =  95;
      priority(PRIOR094) =  94;
      priority(PRIOR090) =  90;
      priority(PRIOR010) =  10;
      priority(PRIOR002) =   2;
      priority(PRIOR001) =   1;

Start_Rexx;
    'CLEAR';   /* clear the screen */
    say 'I will use the data in file ORDER LIST A'
    say '       OK ? (Y/N)';
    pull ans;
    if ans='Y' | ans='y' then 'FILEDEF ORDERS DISK ORDER LIST A';
    else do;
    say 'I will prompt for the filename filetype and filemode of the data';
    say 'Enter filename'; pull fn dummy;
    say 'Enter filetype'; pull ft dummy;
    say 'Enter filemode'; pull fm dummy;
    lOX 'S 'fn ft fm ' (. ';
    if rc^=0 then do; say 'file not found'; exit; 'HX'; end;
    'FILEDEF ORDERS DISK ' fn ft fm ;
    end;

'FILEDEF TERM  TERMINAL';
'FILEDEF TUBE  TERMINAL';
```

```
'FILEDEF SYSIN DISK NSJS INSTRUCT A';
'FILEDEF SYSOUT DISK DUMMY DATA A (LRECL 80 RECFM F';
'FILEDEF TOFILE DISK OUTPUT LIST C (LRECL 80 RECFM F';
'CLEAR';   /* clear the screen */
STOP_REXX;
```

| PRELIMINARY ORDER LIST | | | | |
|---|---|---|---|---|
| 201 | 90 | 2 | 10 | N |
| 101 | 89 | 2 | 5 | Y |
| 301 | 87 | 1 | 50 | N |
| 301 | 83 | 2 | 50 | N |
| 301 | 74 | 1 | 50 | N |
| 401 | 86 | 1 | 50 | N |
| 401 | 75 | 1 | 50 | N |
| 501 | 87 | 1 | 50 | Y |
| 601 | 82 | 1 | 150 | N |
| 101 | 90 | 2 | 5 | Y |
| 301 | 86 | 1 | 50 | N |
| 301 | 80 | 1 | 50 | N |
| 301 | 73 | 1 | 50 | N |
| 401 | 84 | 3 | 50 | N |
| 401 | 74 | 2 | 50 | N |
| 501 | 82 | 2 | 50 | Y |
| 301 | 84 | 2 | 50 | N |
| 301 | 74 | 1 | 50 | N |
| 401 | 88 | 1 | 50 | N |
| 401 | 80 | 1 | 50 | N |
| 501 | 88 | 1 | 50 | Y |
| 501 | 76 | 2 | 50 | N |

While the invention has been described in terms of a preferred embodiment in a specific system environment, those skilled in the art recognize that the invention can be practiced, with modification, in other and different systems within the spirit and scope of the appended claims.

We claim:

1. A method for operating a computer system to generate a schedule for a plurality of orders, the schedule having a plurality of slots for orders, the system having an inference engine for processing a set of rules including disposition, strategy and error detection rules, having a production memory for storing the set of rules and having working memory for storing a pool of schedules, comprising the steps of:
   (a) forming a current parent schedule in the pool in the working memory having a first slot filled by an order by processing predetermined strategy rules using the inference engine;
   (b) generating in the pool in the working memory all possible child schedules for the current parent schedule with each child schedule having at least one more slot filled than the current parent schedule by processing a rule using the inference engine;
   (c) calculating error counts for the child schedules which violate the error detection rules by processing the error detection rules using the inference engine;
   (d) deleting the current parent schedule from the pool in the working memory by processing a rule using the inference engine;
   (e) deleting from the pool in the working memory the child schedules having error counts exceeding a predetermined error count threshold by processing the disposition rules using the inference engine;
   (f) determining by processing a rule using the inference engine whether there are any schedules in the pool in the working memory and selecting, by processing a rule using the inference engine, a schedule in the pool, if any exists, as the current parent schedule while leaving the remaining schedules in the pool or ending if there are no schedules in the pool; and
   (g) repeating steps (b) through (f) until a schedule with all slots filled is found which meets the disposition rules by processing a rule using the inference engine.

2. The method of claim 1 further comprising the steps of:
   stopping the repetition of steps upon input from an operator;
   modifying the current parent schedule in the working memory responsive to the operator input using a rule processed by the inference engine;
   deleting all schedules from the pool in the working memory except the current parent schedule using a rule processed by the inference engine; and
   resuming the method of claim 27 at the generating step.

3. The method of claim 1 further comprising the step of monitoring a value representing the elapsed time or iterations through a loop of steps, and responsive to the value exceeding a limit, altering the disposition rules by lowering the threshold of error counts to a second preselected value and returning previously deleted schedules having error counts less than the second preselected value back into the pool, thereby dynamically relaxing the rules so that an acceptable schedule may be found.

4. The method of claim 2 further comprising the step of monitoring a value representing the elapsed time or iterations through a loop of steps, and responsive to the value exceeding a limit, altering the disposition rules by lowering the threshold of error counts to a second preselected value and returning previously deleted schedules having error counts less than the second preselected value back into the pool, thereby dynamically relaxing the rules so that an acceptable schedule may be found.

5. The method of claim 4 wherein the orders are for units of steel.

* * * * *